(12) United States Patent
Castonguay et al.

(10) Patent No.: US 8,231,304 B2
(45) Date of Patent: Jul. 31, 2012

(54) ARTIFICIAL FLAGSTONE

(75) Inventors: Bertin Castonguay, Magog (CA);
Robert Daoust, Boucherville (CA)

(73) Assignee: Les Materiaux de Construction Oldcastle Canada, Inc., St. John, New Brunswick (CA)

( * ) Notice: Subject to any disclaimer, the term of this patent is extended or adjusted under 35 U.S.C. 154(b) by 398 days.

(21) Appl. No.: 12/212,974

(22) Filed: Sep. 18, 2008

(65) Prior Publication Data
US 2009/0155497 A1    Jun. 18, 2009

Related U.S. Application Data

(60) Provisional application No. 60/974,274, filed on Sep. 21, 2007.

(51) Int. Cl.
*E01C 5/00*    (2006.01)
(52) U.S. Cl. ............... 404/39; 404/41; 404/42
(58) Field of Classification Search ............ 52/596, 52/609, 608; 404/39, 41, 42; D25/113
See application file for complete search history.

(56) References Cited

U.S. PATENT DOCUMENTS

| | | | | |
|---|---|---|---|---|
| 456,378 A * | 7/1891 | Hurlbut | ............ | 404/39 |
| 2,605,681 A * | 8/1952 | Victor Trief | ............ | 404/41 |
| 3,722,162 A * | 3/1973 | Ludvigsen | ............ | 52/608 |
| 4,627,764 A * | 12/1986 | Scheiwiller | ............ | 404/41 |
| 4,761,095 A * | 8/1988 | Bartlechner | ............ | 404/41 |
| 5,211,895 A * | 5/1993 | Jacklich, Sr. | ............ | 264/71 |
| D431,305 S * | 9/2000 | Barth et al. | ............ | D25/113 |
| 6,168,347 B1 * | 1/2001 | Milot et al. | ............ | 404/34 |
| D442,703 S * | 5/2001 | Fifield | ............ | D25/113 |
| 6,588,975 B2 * | 7/2003 | Ross | ............ | 404/75 |
| 6,939,077 B1 | 9/2005 | Hart | | |
| D553,260 S * | 10/2007 | Castonguay et al. | ......... | D25/113 |
| D590,070 S * | 4/2009 | Castonguay | ............ | D25/113 |

(Continued)

FOREIGN PATENT DOCUMENTS

CA          62503       2/1989
(Continued)

OTHER PUBLICATIONS

PCT/CA2008/001630, International Search Report dated Jan. 6, 2009.

*Primary Examiner* — Gary S Hartmann
(74) *Attorney, Agent, or Firm* — Shin Hung; Borden Ladner Gervais LLP

(57) ABSTRACT

An artificial stone is disclosed for use in creating a covering a supporting surface. The artificial stone includes a base portion for placement on the supporting surface, which base portion is shaped as a right regular prism for patterned, fitting arrangement of the flagstone with like flagstones to produce a continuous surface covering. The base portion has a regular base contour. The stone further includes a top portion with a facing surface, the facing surface having an irregularly shaped top contour different from the base contour and an intermediate portion connecting the top portion with the base portion. The intermediate portion has an inclined wall extending between the top portion and a sidewall of the base portion. Stones of this construction can easily be arranged in a regular, repeated pattern to generate a continuous covering for the supporting surface without the surface of the resulting covering having a regular, patterned appearance. The irregular top contours of the stones, simulate the appearance of natural stone.

14 Claims, 35 Drawing Sheets

U.S. PATENT DOCUMENTS

D590,071 S * 4/2009 Castonguay ................. D25/113
D590,072 S * 4/2009 Castonguay ................. D25/113

FOREIGN PATENT DOCUMENTS

| CA | 92131 | 4/2001 | |
|---|---|---|---|
| CA | 92132 | 4/2001 | |
| CA | 2446148 | 11/2002 | |
| CA | 2550358 | 12/2007 | |
| EP | 0 227 144 | * | 7/1987 |
| KR | 2004 076558 | * | 9/2004 |

* cited by examiner

ARTIFICIAL FLAGSTONE

REFERENCE TO RELATED APPLICATIONS

This application claims convention priority from U.S. Provisional Application Ser. No. 60/974,274, filed Sep. 21, 2007 and entitled Artificial Flagstone, the contents of which are incorporated into the present application in their entirety.

FIELD OF THE INVENTION

The present invention relates to elements and sets of elements for forming a surface covering. More particularly, to stones, flagstones, bricks, pavers and tiles for forming surface coverings, such as pavements or wall coverings.

BACKGROUND OF THE INVENTION

It is well known in the art that surfaces, such as walkways, driveways, patios, floors, work surfaces, walls and other interior or exterior surfaces can be covered for durability and aesthetics with flagstones, stones, bricks, pavers, tiles and other architectural surface covering elements. Natural stone surface coverings are constructed by fitting together irregularly sized and shaped flat stones, such as flagstone and slate. This work requires a skilled stonemason to select, cut and fit the stones. It is labor intensive, and accordingly expensive.

Various efforts have been made to develop artificial building elements, such as bricks, stones, flagstones, pavers, or the like with the appearance of natural stone. Such artificial building elements are usually relatively inexpensively mass produced by molding them from concrete, usually in a dry casting operation. They are typically provided in geometric shapes, such as triangles, squares, rectangles and hexagons, or combinations thereof. This allows the side by side placement of multiple elements in fitting arrangement to produce a surface covering. The geometric elements are usually installed in repeating geometric patterns. The repetitive nature of these patterns counteracts any 'natural' appearance possibly achieved on the individual elements. Furthermore, although conventional artificial surface covering elements can be laid in random, non-repeating patterns, those patterns still do not achieve the aesthetically pleasing appearance nor the degree of natural irregularity that is desirable in custom stone walkways, driveways, patios and the like.

Numerous manufactured stones have been developed which do not have a regular geometric outline and are intended to provide the appearance of natural stone. However, in order to ensure a continuous and durable surface covering without shifting, the individual stones in the covering need to fit together, which means they must be shaped for a fitting arrangement with other like stones. This is especially the case with paving stones and is the reason why natural stone coverings are labor intensive to install and expensive. The requirement that the stones need to engage other like stones in a fitting arrangement severely limits the range of shapes, which can be used for the individual stones. Even when a small number of different shapes are used, placement of many stones over a larger area again results in a regular, repeating surface pattern. The requirement for a fitting arrangement also means that surface coverings of known artificial stones, even if stones with irregular shapes are used, are easily recognizable by their regular joint width. This is due to the fact that conventional stones have identical or at least very similar top and bottom contours.

Thus, there still exists a need for an artificial stone, flagstone, paving stone and the like which has the appearance of natural stone, even when installed in a fitting arrangement with other like stones in a regular pattern.

SUMMARY OF THE INVENTION

Throughout the description, the expressions 'stone' and 'flagstone' are used interchangeably without distinction to designate any artificial blocks, stones, flagstones, paving stones, pavers, siding bricks or blocks, and the like. Therefore, these expressions should be given their broadest possible meaning and should be interpreted to encompass any and all artificial stone elements for forming a surface covering.

The term 'artificial' is used throughout this description to designate any non-naturally occurring product.

In one preferred aspect, the present invention provides an artificial flagstone for covering a supporting surface. The flagstone includes a base portion for placement on the supporting surface. The base portion has a regular geometric shape for fitting arrangement of the flagstone with like flagstones in a regular pattern to produce a surface covering.

'Fitting arrangement' as used throughout this description to designate a patterned arrangement in which elements are shaped to fit together to ensure a continuous surface covering, while preventing shifting or displacement of the elements.

The term "regular" as used in relation to the shape of the base contour and the shape of the base portion in this description is used to define regular geometric shape.

Flagstones in accordance with the invention further include a top portion with a facing surface having a natural appearance and a regular or irregular outline or contour, which differs from a contour of the base portion. The top portion includes a sidewall or rim depending from the contour of the facing surface. An intermediate portion connects the top portion with the base portion. This basic structure allows the manufacture of a large number of stones with base portions of the same principle geometric shape and top portions and facing surfaces, which differ from one stone to another. This approach allows the creation of a reliable surface covering due to the base portions fitting together in a fitting arrangement in a regular pattern, while at the same time providing for great variability in appearance of the facing surface, resulting in an irregular and more natural appearance of the covering.

Artificial flagstones in accordance with the invention are preferably made by dry casting. The contour of the facing surface preferably fits into the contour of the base portion and is preferably positioned above the footprint of the base portion. This facilitates stripping from the mold during dry casting. Furthermore, the depending rim is preferably perpendicular to a bottom surface of the base portion so that facing surfaces and top portions of different shape and appearance can be produced in the same mold frame by simply changing the compression shoe of the dry casting mold. The depending rim ensures proper alignment and fit of the shoe in the mold frame and reduces the potential for damage of the molded stone during stripping from the mold.

The intermediate portion preferably has at least one circumferential portion in which it is outwardly tapered and has a wall extending between the rim and a sidewall of the base portion. Preferably, at least part of the wall connects to the base portion sidewall at an acute angle of up to 25°, preferably at an angle of 15°. This ensures a more even distribution of the concrete mix during dry casting and, thus, a more even fill of the mold, which greatly facilitates the dry casting operation. Damage to the freshly molded stone during stripping and disengagement from the mold, due to sharp corners in the mold and adhesion to mold surfaces, is also minimized with this construction.

As already mentioned, artificial flagstones in accordance with the invention are preferably manufactured by dry casting. In order to facilitate filling of the dry casting mold and stripping of the freshly molded stone, the base portion, which has multiple corners, preferably has at least one corner which is chamfered, beveled, or rounded. More preferably, at least one pair of opposing corners is chamfered, beveled or rounded.

In another preferred aspect, the invention provides an artificial flagstone for covering a supporting surface, including a base portion for placement on the supporting surface, the base portion having a polygonal cross-section and being shaped as a right prism for fitting engagement of the flagstone with like flagstones in an arrangement producing a surface covering; a top portion with a facing surface having a contour fitting within the polygonal cross-section of the base portion and having an appearance of natural stone; and an intermediate portion connecting the top and base portions. The contour of the facing surface is preferably irregular for enhancing the natural appearance. To further enhance the natural appearance of the top portion, the facing surface preferably has at least one irregularly shaped protrusion or depression for giving the top portion the appearance of natural stone. More preferably, the facing surface has at least one irregularly shaped protrusion and at least one irregularly shaped depression.

In a variant, the facing surface has at least two areas of different elevation, which areas are preferably irregularly shaped areas.

To avoid the generation of the 'linear line effect' often observed with regularly shaped artificial stones of the art, especially where the facing surface has a polygonal contour similar or equal to a footprint of the stone, the flagstone of the present invention is preferably provided with a facing surface which is rotated or shifted relative to the polygonal footprint of the base portion. This is particularly advantageous when the base portion is in the shape of a right regular prism, for example a rectangular prism, and the facing surface has a polygonal outline with the same number of sides as the base portion. Rotated in this context means a placement of the facing surface in an orientation in which an axis of symmetry of the facing surface is oriented in a different direction than a corresponding axis of symmetry of the base portion. As a result, the edges of the top surface are not parallel to the sides of the base portion. In other words, the base portion has a side wall for each side of the polygonal base contour and the top contour is rotated or shifted relative to the base contour so that at least one side of the top contour intersects with a plane of one side wall of the base portion.

In a further preferred aspect of the invention, the artificial flagstone is shaped and constructed as a paving stone. The artificial flagstone of the invention is preferably made by dry casting and is most preferably a dry cast paving stone.

In still another preferred aspect, the invention provides a set of artificial flagstones for producing a surface covering in a regular, repeated pattern, but with an irregular surface, simulating the appearance of natural stone. The set includes at least two flagstones with base portions of polygonal cross-section and shaped as a right regular prism to fit together in a regular, repeated pattern and top portions with an irregularly shaped facing surface, whereby a top surface contour of one flagstone in the set is different from the top surface contour of every other flagstone in the set. Preferably, the set of flagstones includes all the stones made within a multi-cavity dry casting frame, whereby each cavity produces one stone with a unique facing surface. The facing surfaces preferably have an irregular outline or contour, which fits within the polygonal cross-section of the base portion, and is located within the footprint of the base portion to facilitate dry casting.

BRIEF DESCRIPTION OF THE DRAWINGS

Other objects and advantages of the invention will become apparent upon reading the detailed description and upon referring to the drawings in which.

DETAILED DESCRIPTION OF PREFERRED EMBODIMENTS

Before explaining the present invention in detail, it is to be understood that the invention is not limited to the preferred embodiments contained therein. The invention is capable of other embodiments and of being practiced or carried out in a variety of ways. It is to be understood that the phraseology and terminology employed herein are for the purpose of description and not of limitation.

The present invention provides artificial stones, flagstones, bricks, pavers and the like for forming surface coverings, such as pavements or wall coverings, having the appearance of a natural stone covering.

Figure 1:
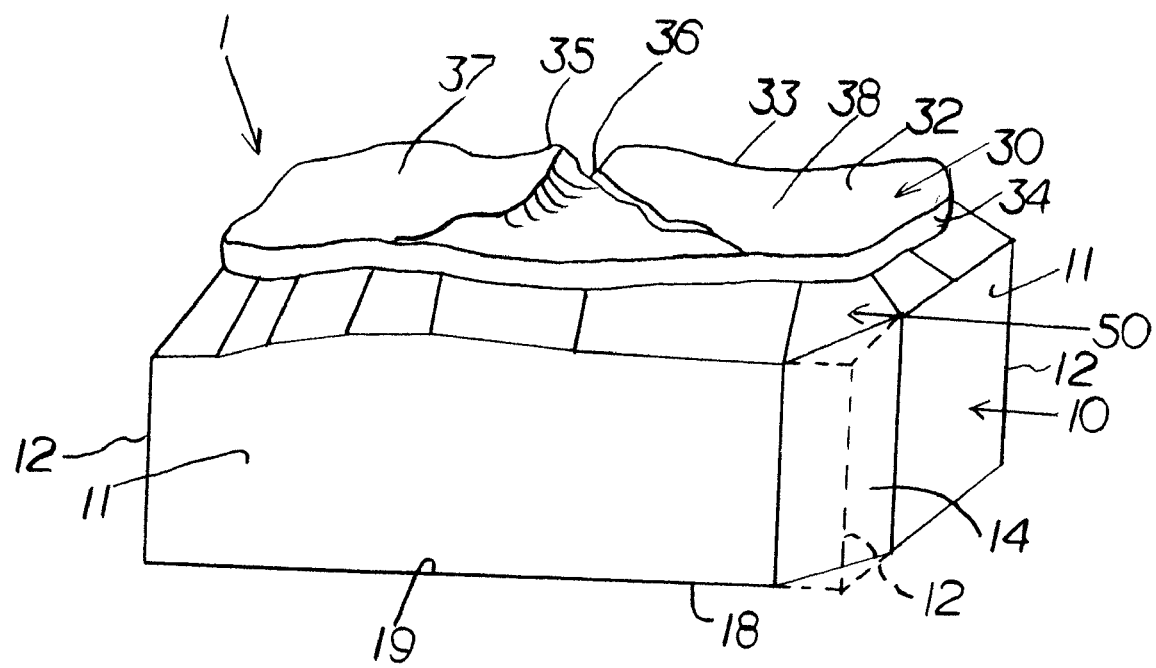
FIG. 1 shows a schematic view of a flagstone in accordance with the invention.
Figure 2:
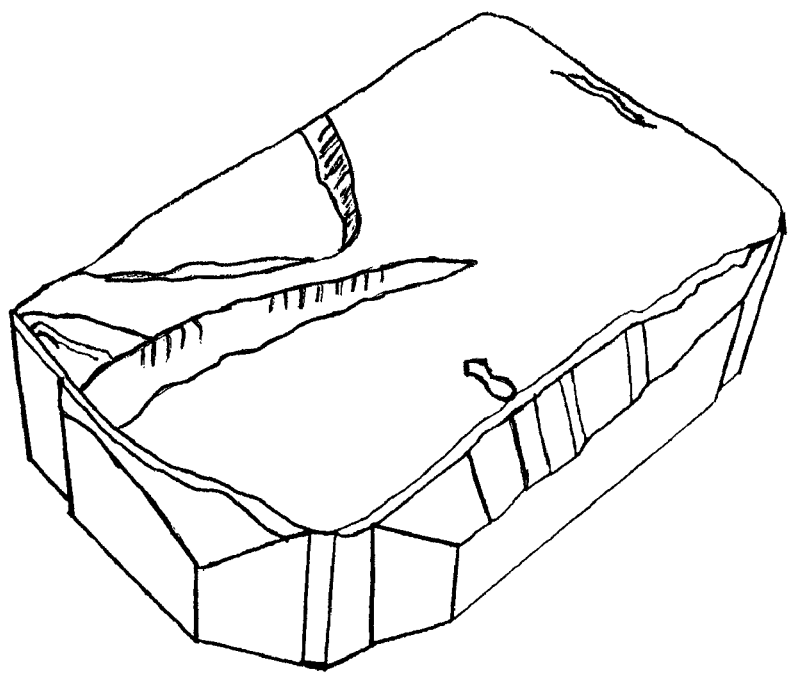
FIG. 2 shows a perspective view of an exemplary flagstone in accordance with the invention.
Figure 3:
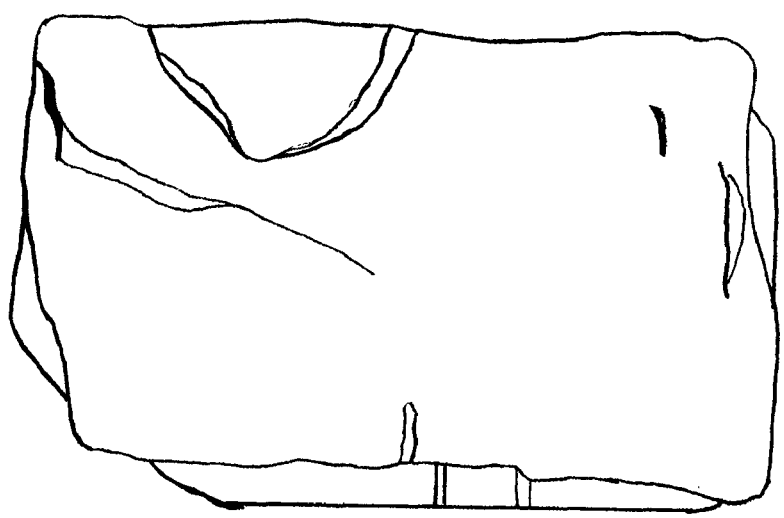
FIGS. 3-7 respectively show top, left side, rear, right side and bottom plan views of the exemplary flagstone illustrated in FIG. 2.
Figure 6:
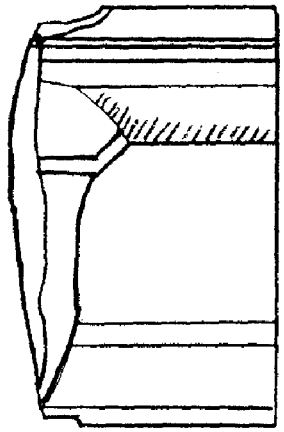
Figure 5:
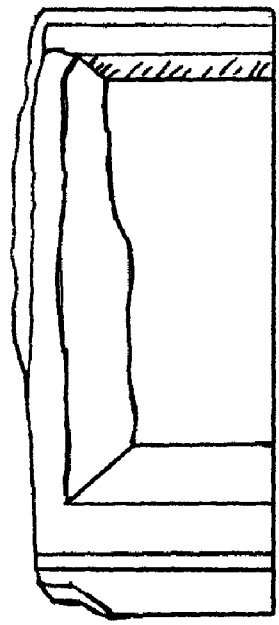
Figure 4:
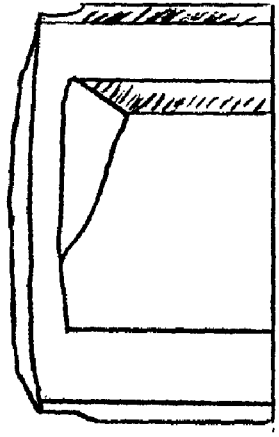
Figure 7:
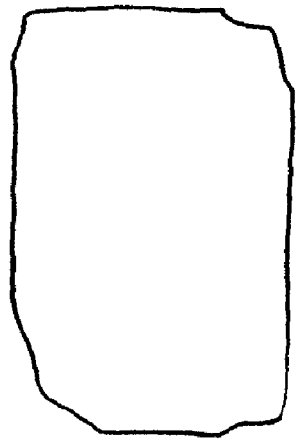

A preferred flagstone 1 in accordance with the invention as illustrated in FIG. 1 includes a base portion 10 for placement on a supporting surface (not shown), for example a wall or a walkway. The base portion 10 is shaped for fitting engagement of the flagstone with like flagstones in a regular or patterned arrangement to produce a surface covering (see FIG. 39). In the illustrated embodiment, the flagstone 1 has a rectangular footprint. It is readily understood that footprints of other geometric shape can be used as long as they allow the flagstone 1 to engage like flagstones in a fitting arrangement. The flagstone 1 further includes a top portion 30 with a facing surface 32 having a natural appearance and a contour 33 with a depending rim 34. An intermediate portion 50 connects the rim 34 with the base portion 10. In the embodiments shown in FIGS. 1 to 38, the base portion 10 has the basic shape of a right prism. This basic structure allows the manufacture of a large number of stones with base portions 10, which easily fit together in a regular pattern, i.e. a fitting arrangement, but have significantly differing top portions 30 and facing surfaces 32. It not only allows for the formation of a reliable and durable surface covering by arranging the stones in a regular pattern, but at the same time provides for great variability in appearance of the top surface 32, resulting in an irregular and natural appearance of the covering due to the differently shaped top portions 30.

It will be readily apparent that the base portion 10 can have any other shape which allows the stone to be fitted with other stones in accordance with the invention into a regular, or patterned arrangement forming a surface covering. For example, the base portion 10 may have an essentially square, hexagonal or triangular cross-section and be in the shape of a cube, a right rectangular prism, a right hexagonal prism, or a wedge.

Figure 8:
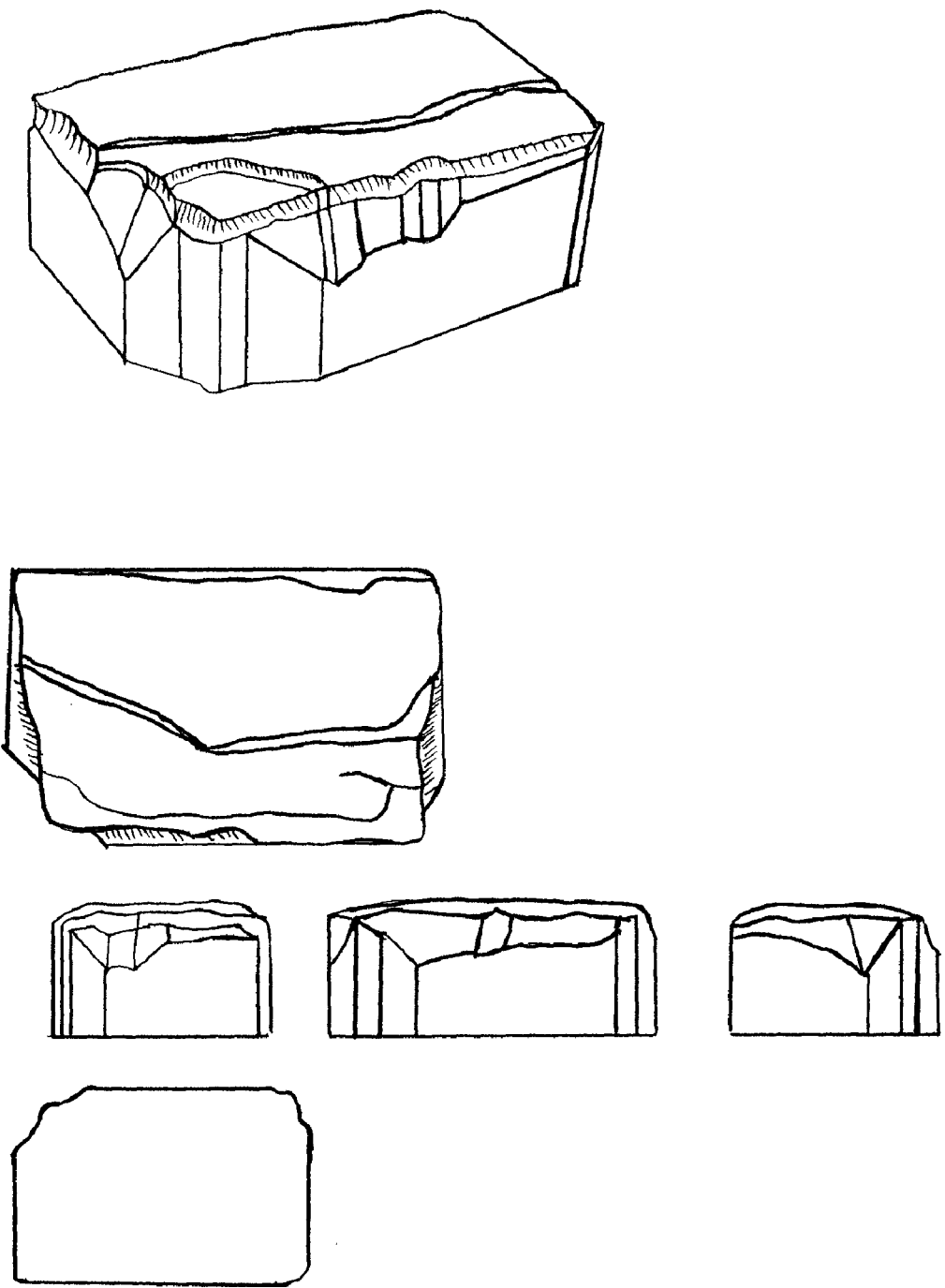
FIGS. 8-38 each illustrate other exemplary flagstones in accordance with the invention, each FIG including a perspective view and left, rear, right and bottom plan views of the respectively shown exemplary flagstone.
Figure 9:
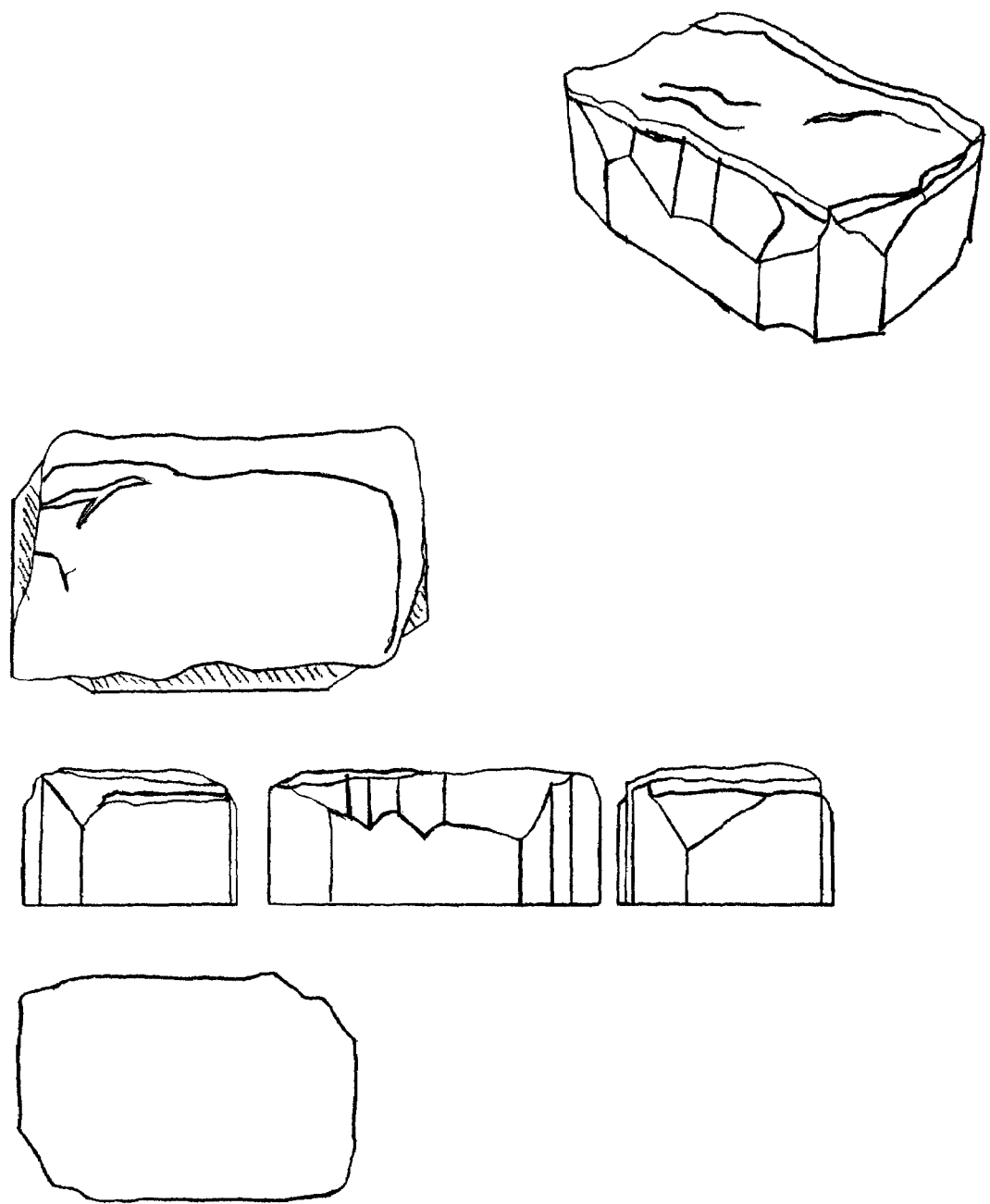
Figure 10:
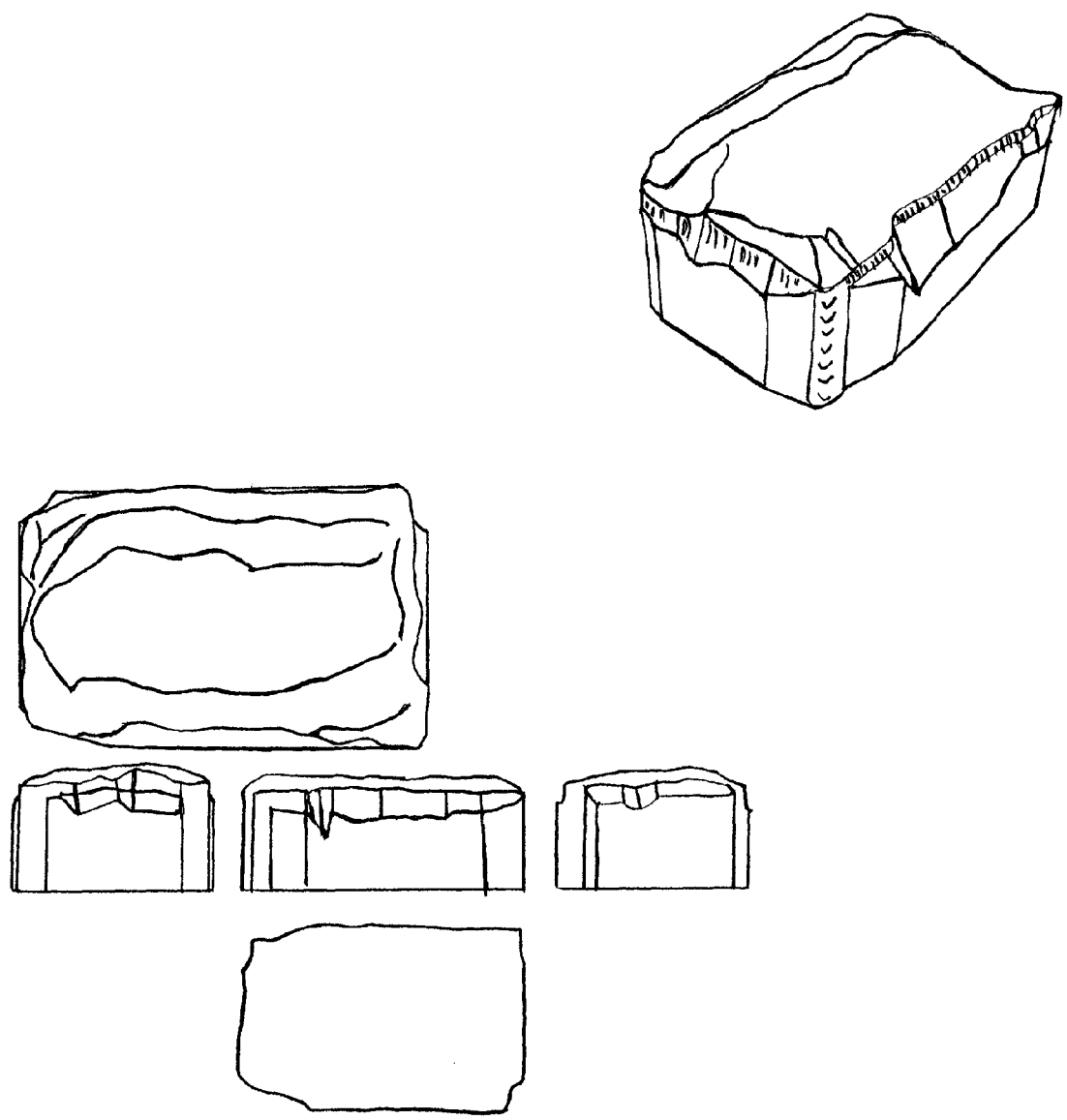
Figure 11:
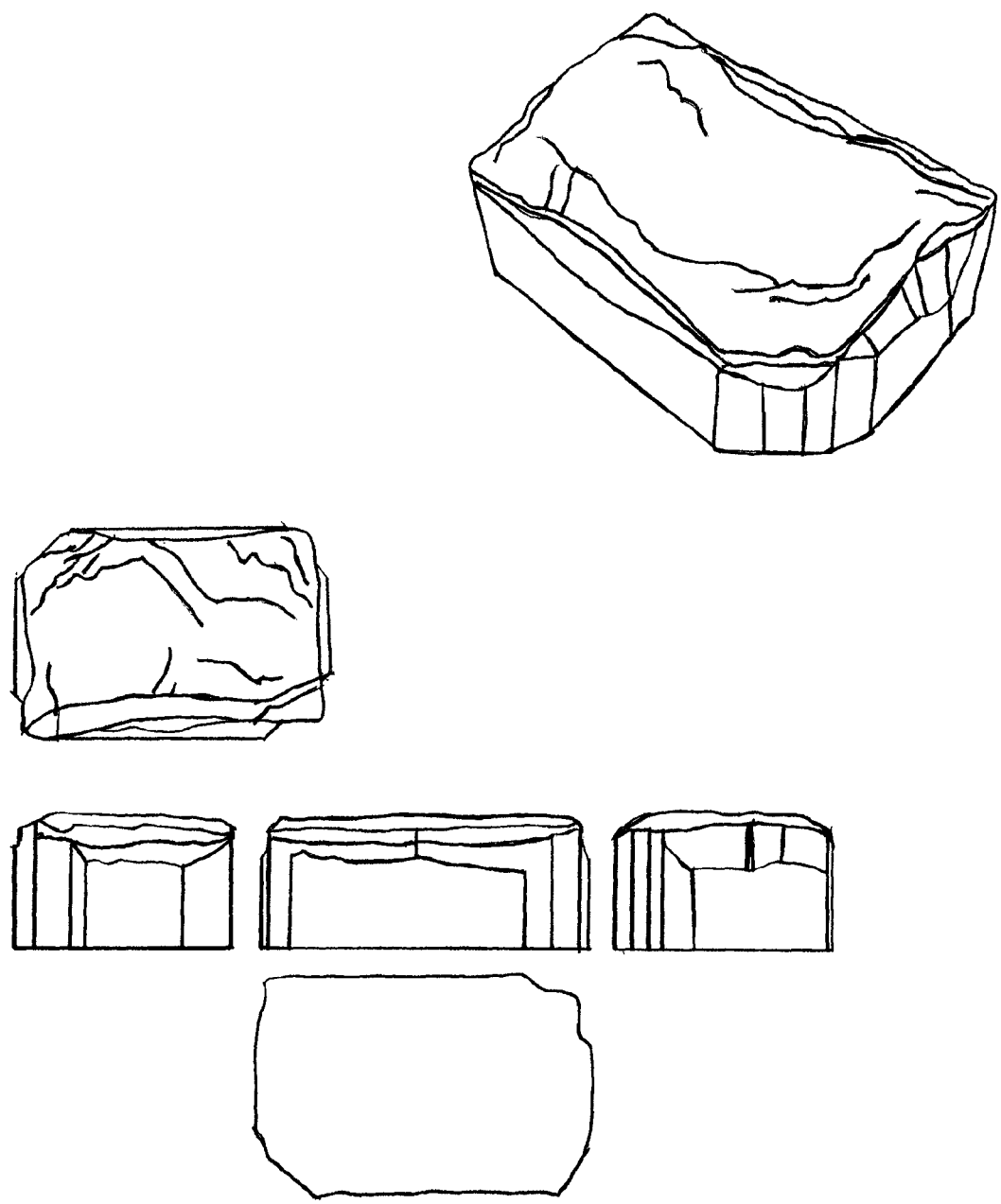
Figure 12:
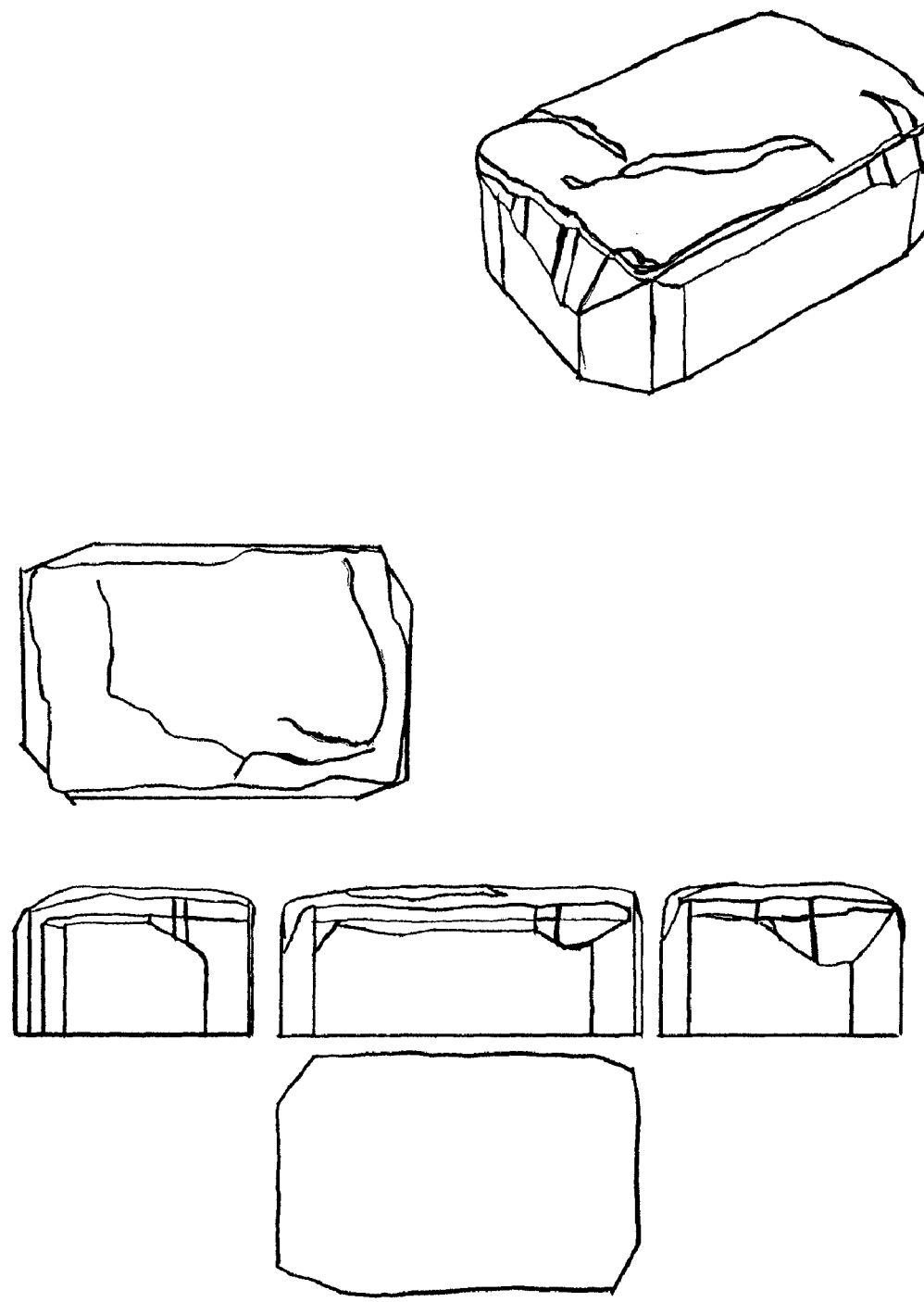
Figure 13:
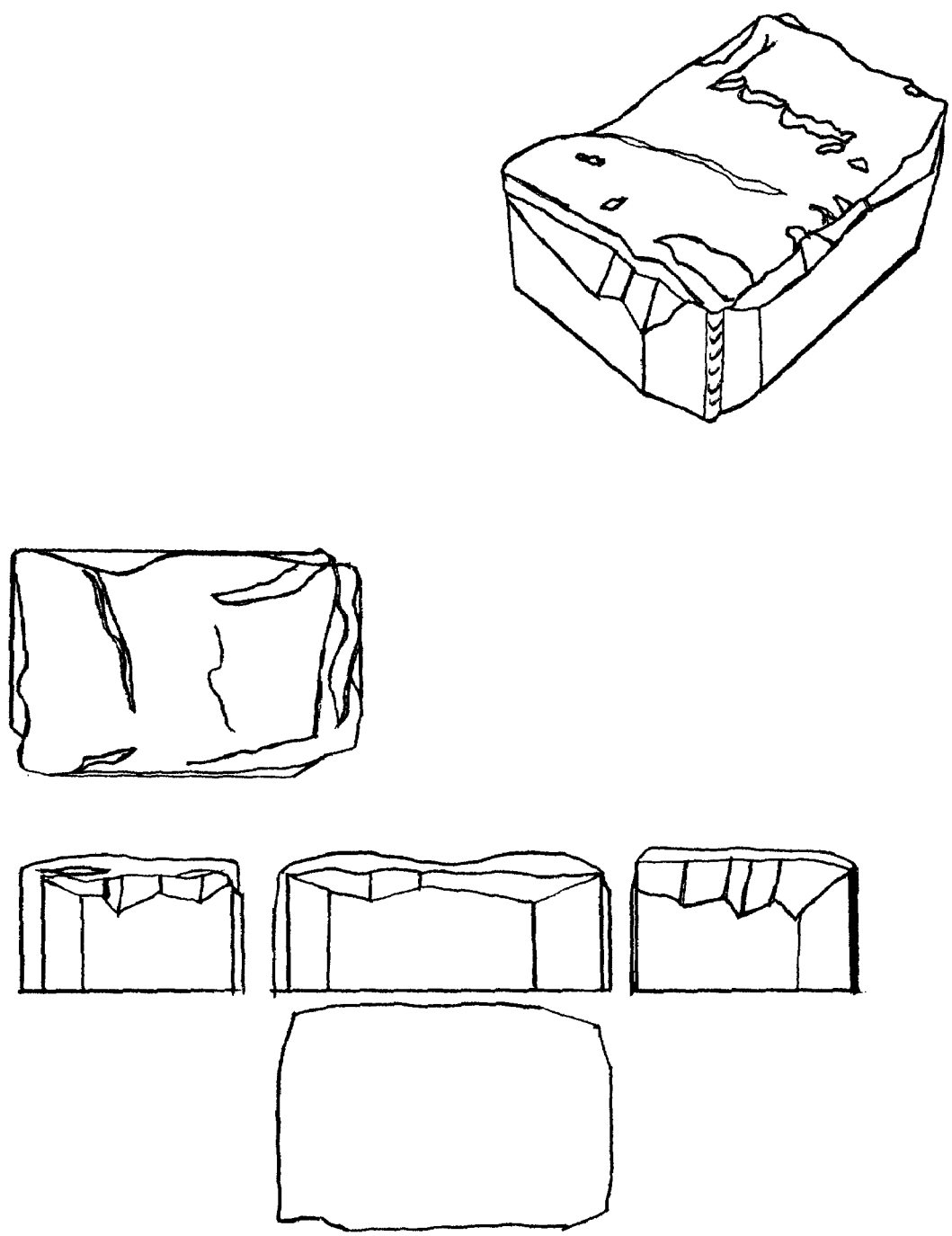
Figure 14:
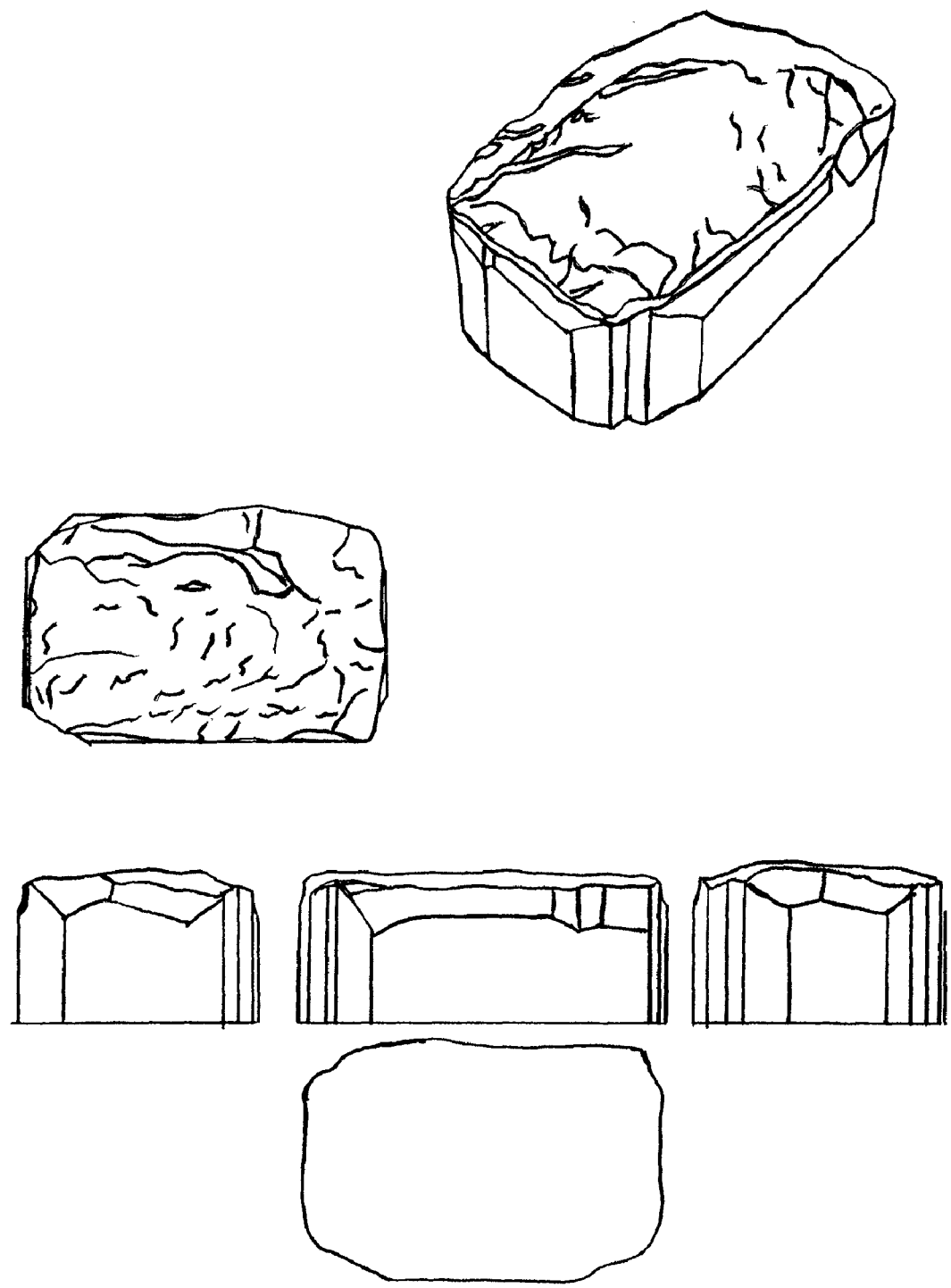
Figure 15:
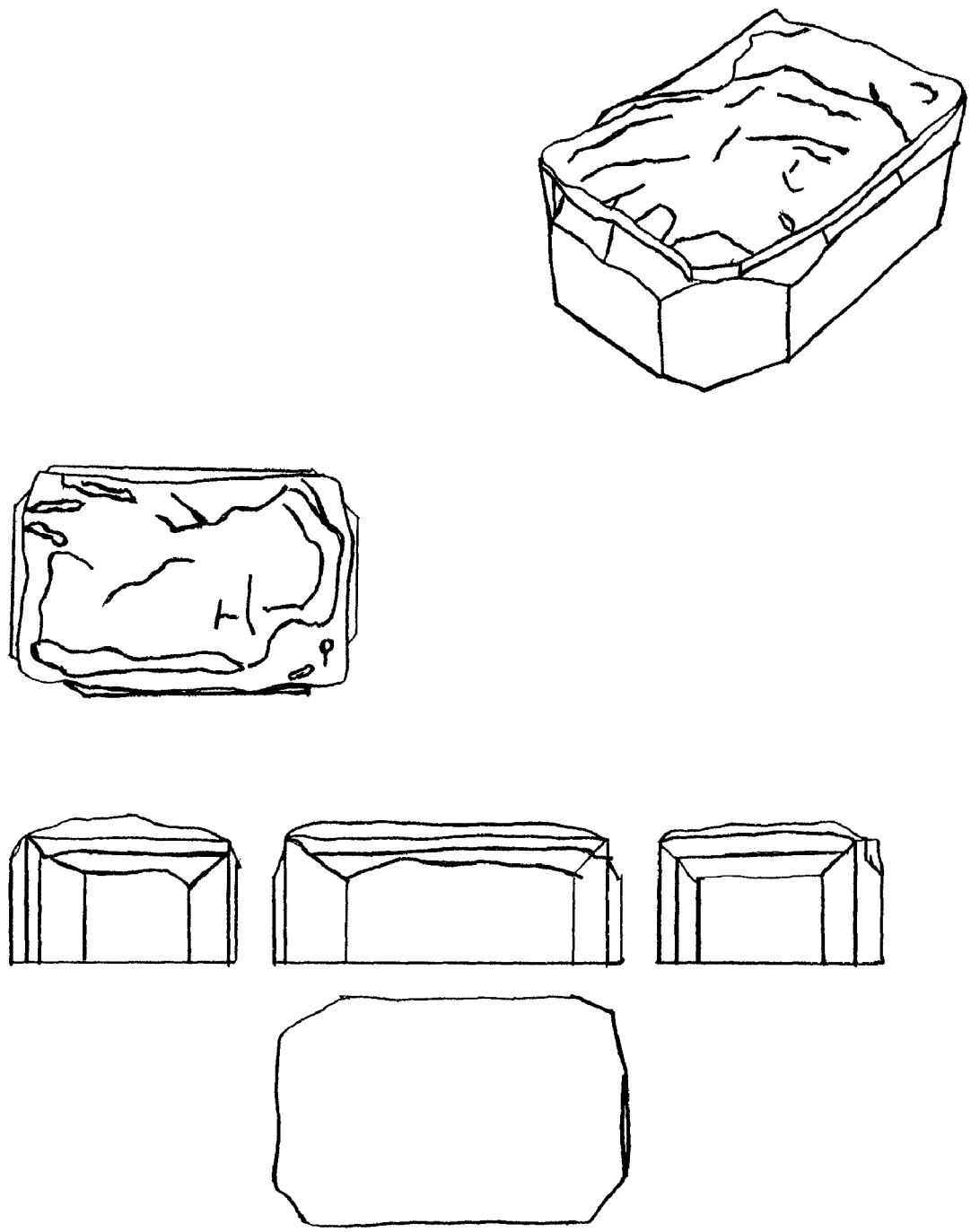
Figure 16:
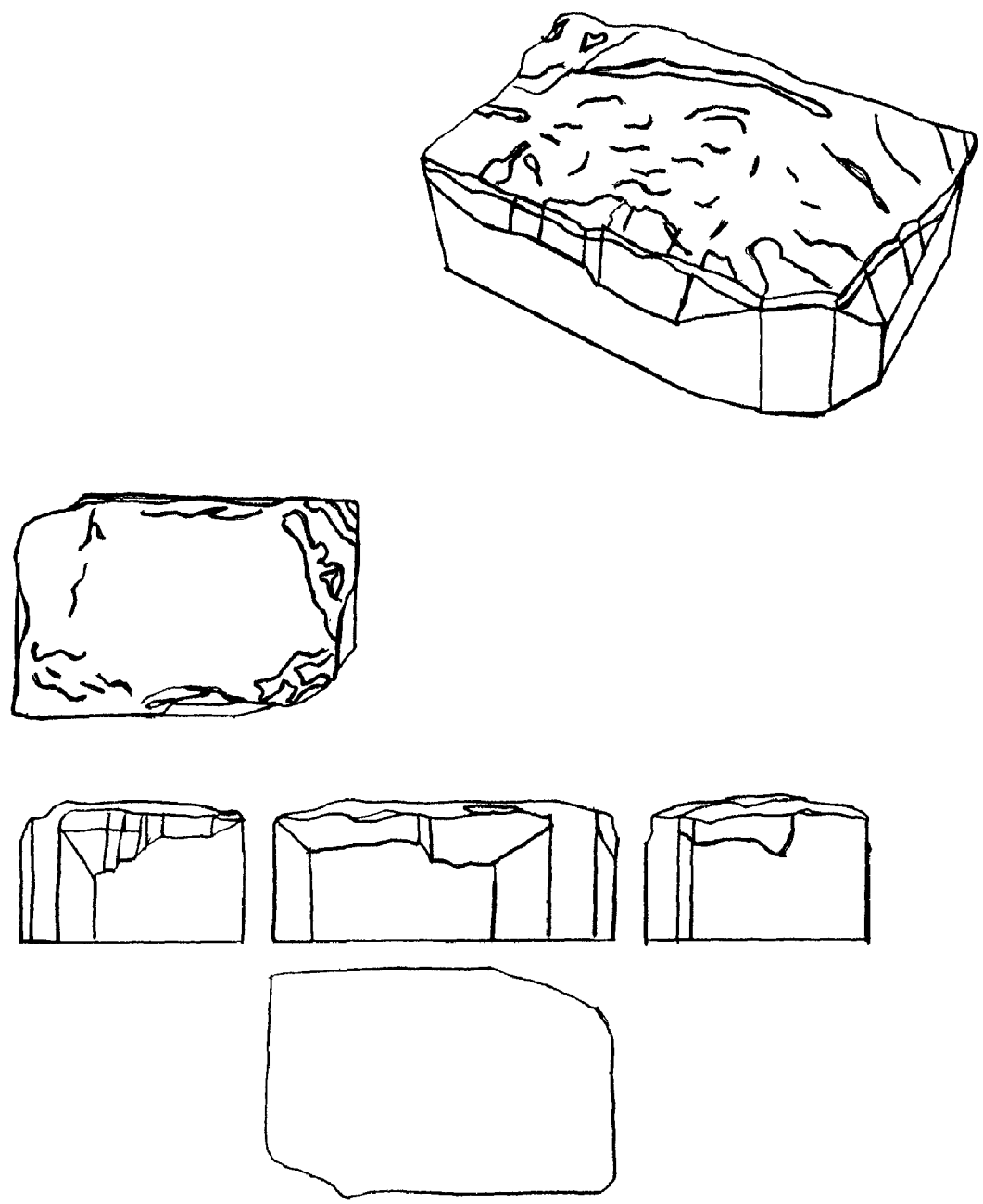
Figure 17:
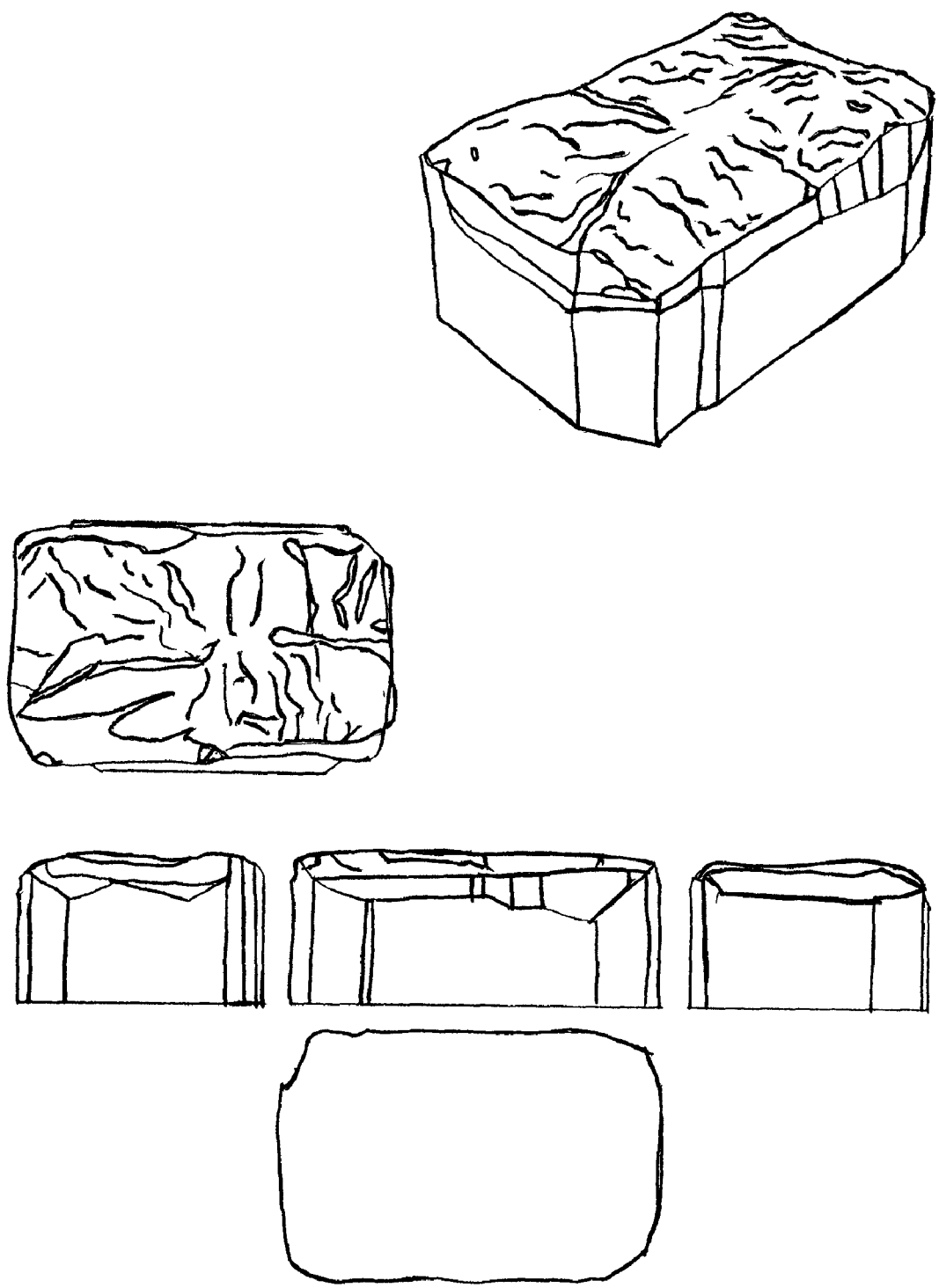
Figure 18:
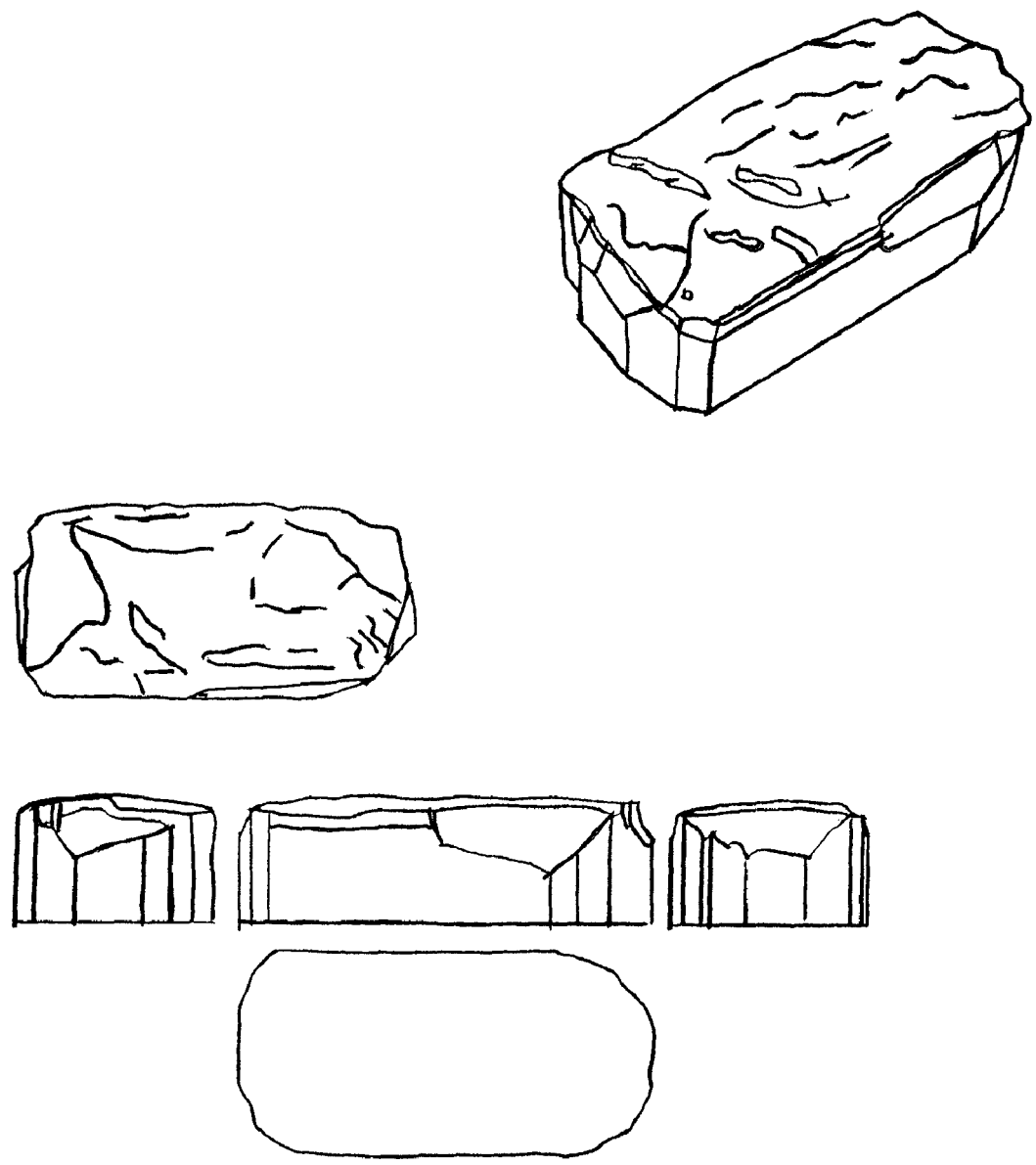
Figure 19:
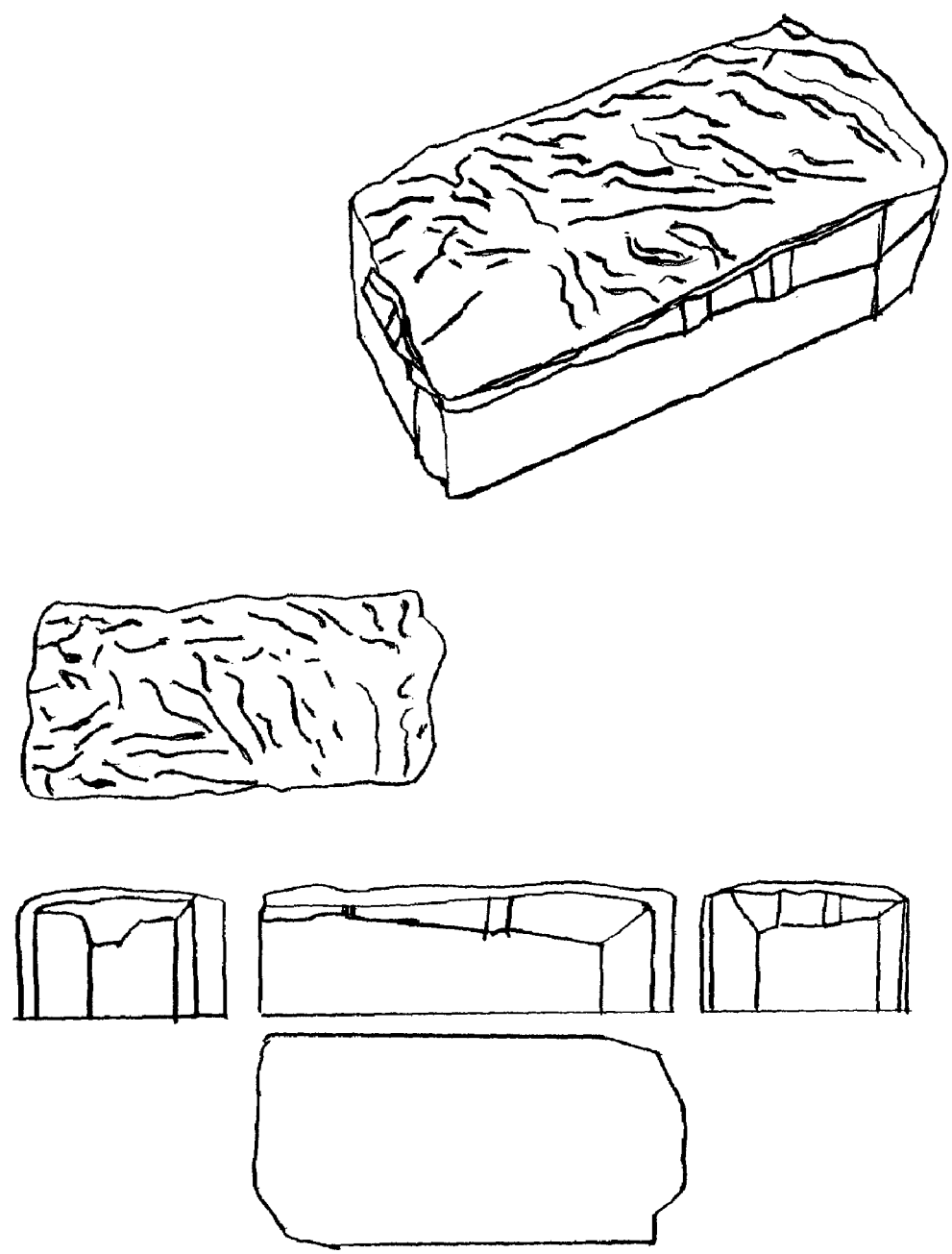
Figure 20:
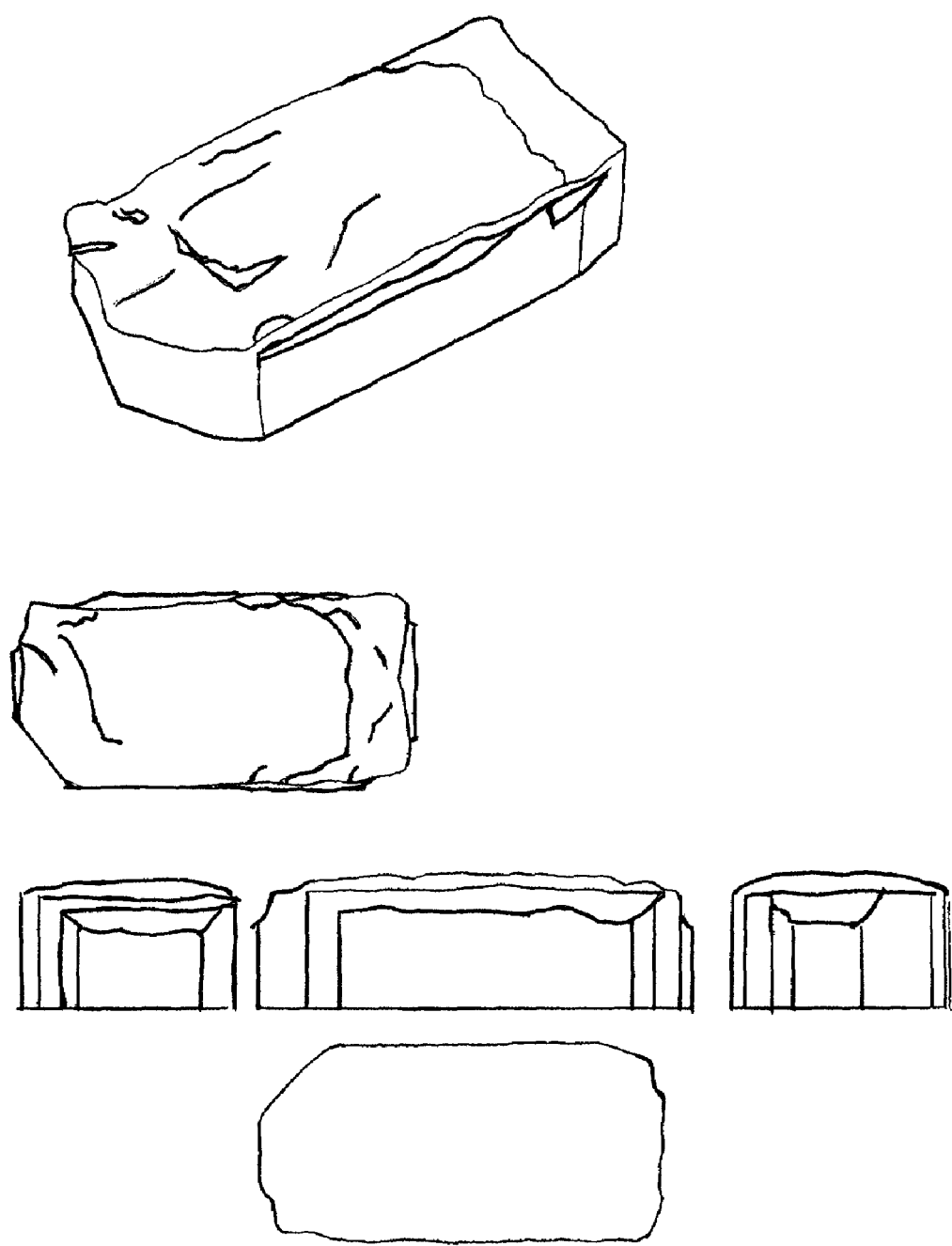
Figure 21:
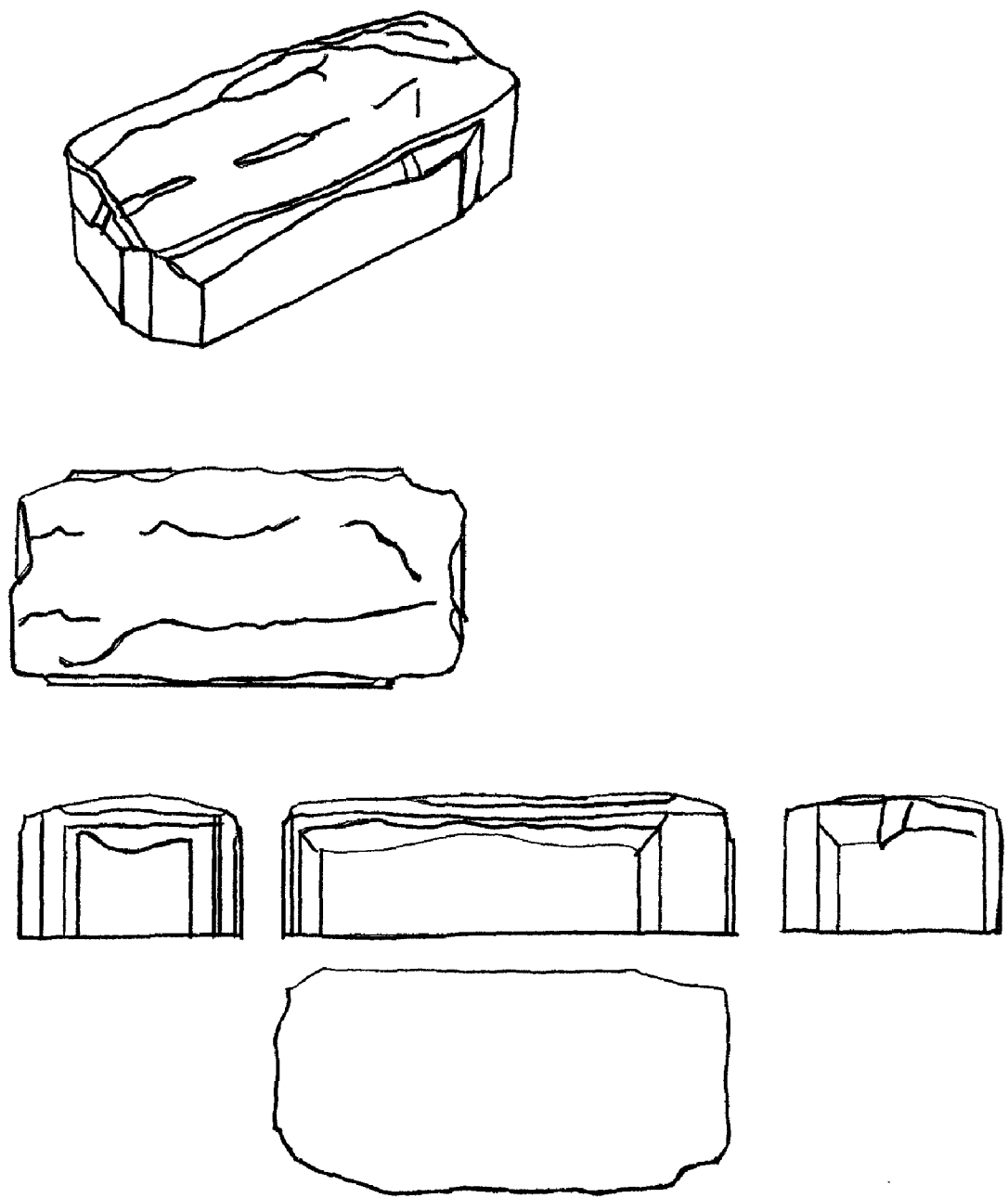
Figure 22:
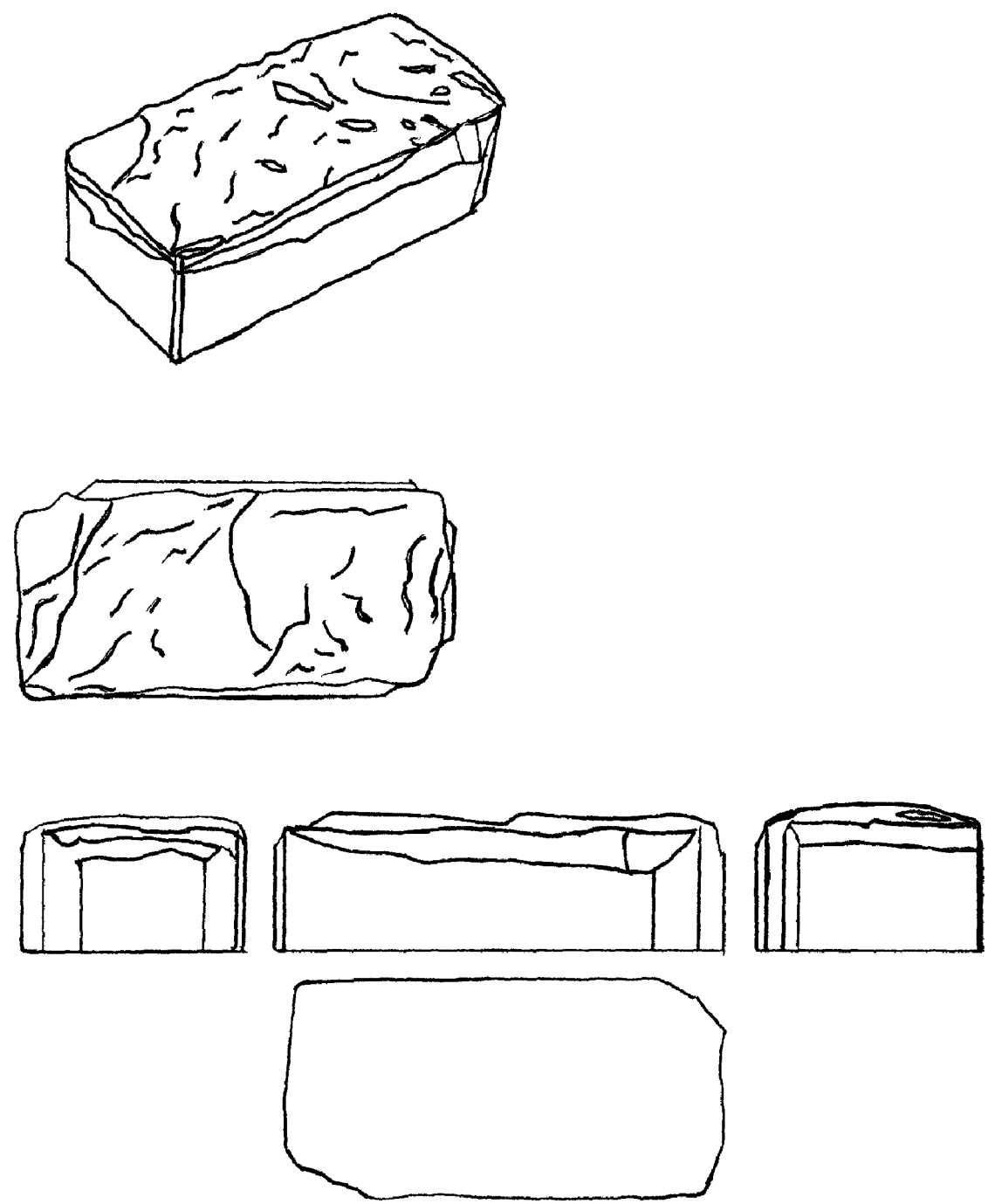
Figure 23:
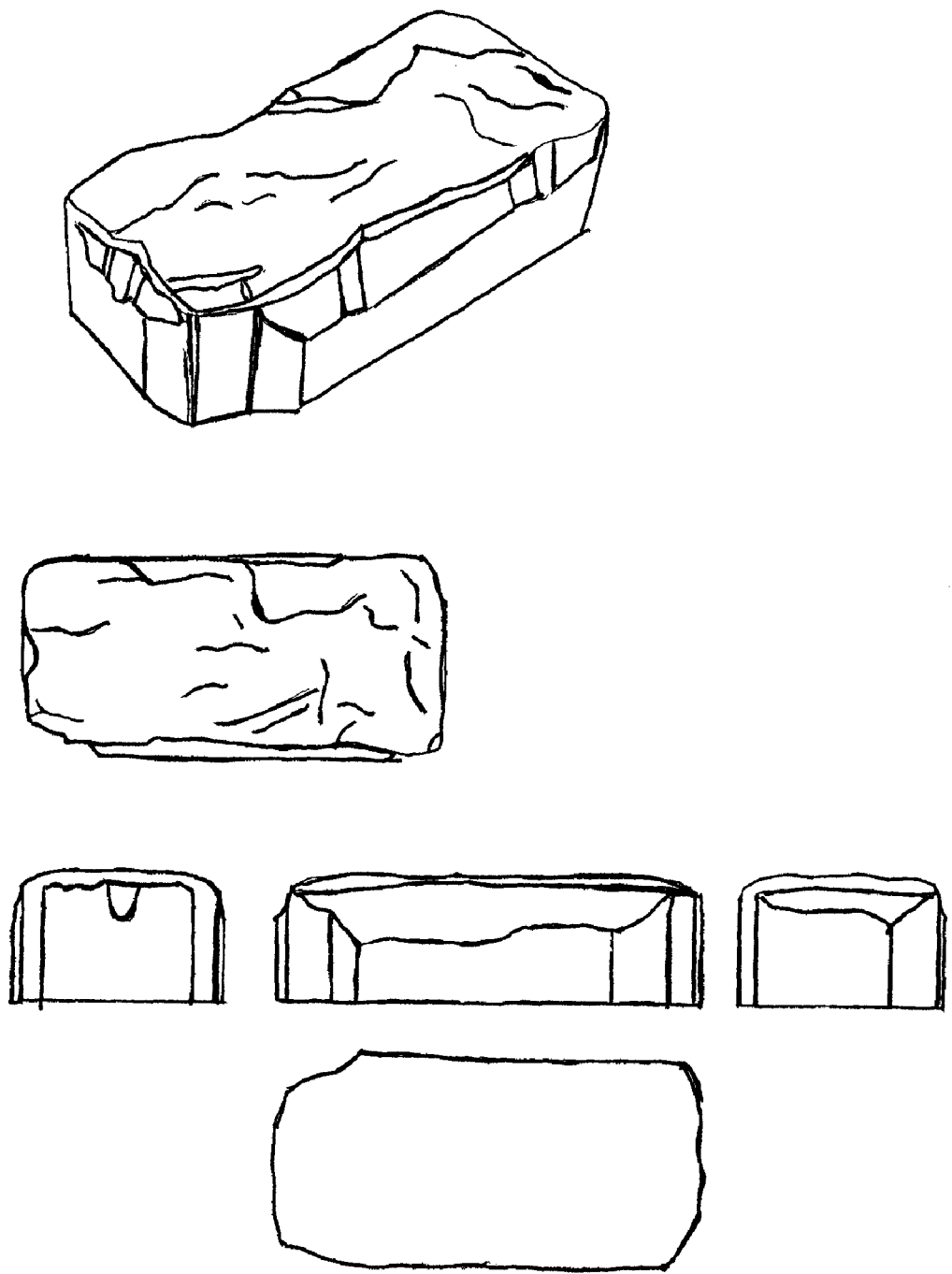
Figure 24:
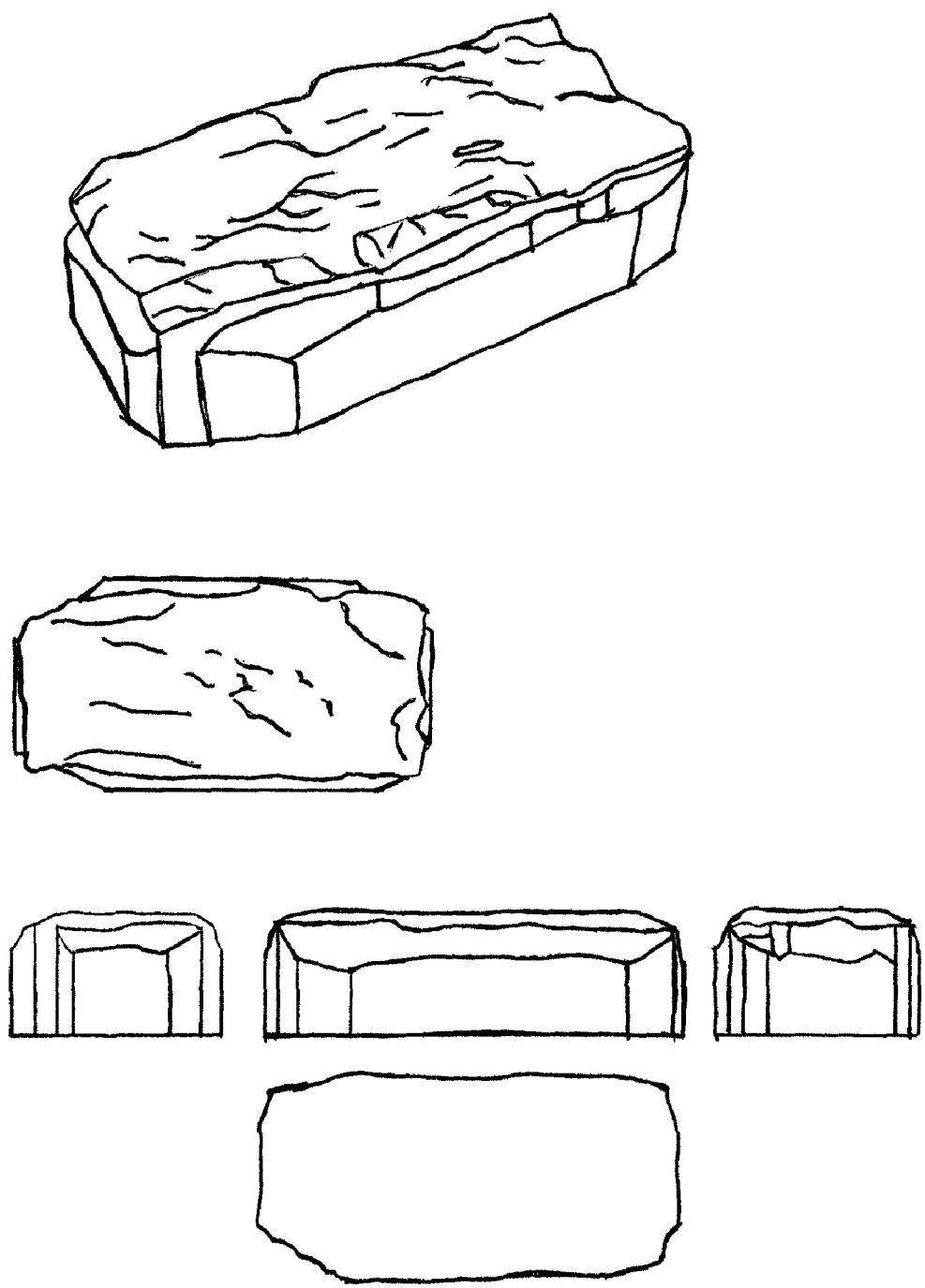
Figure 25:
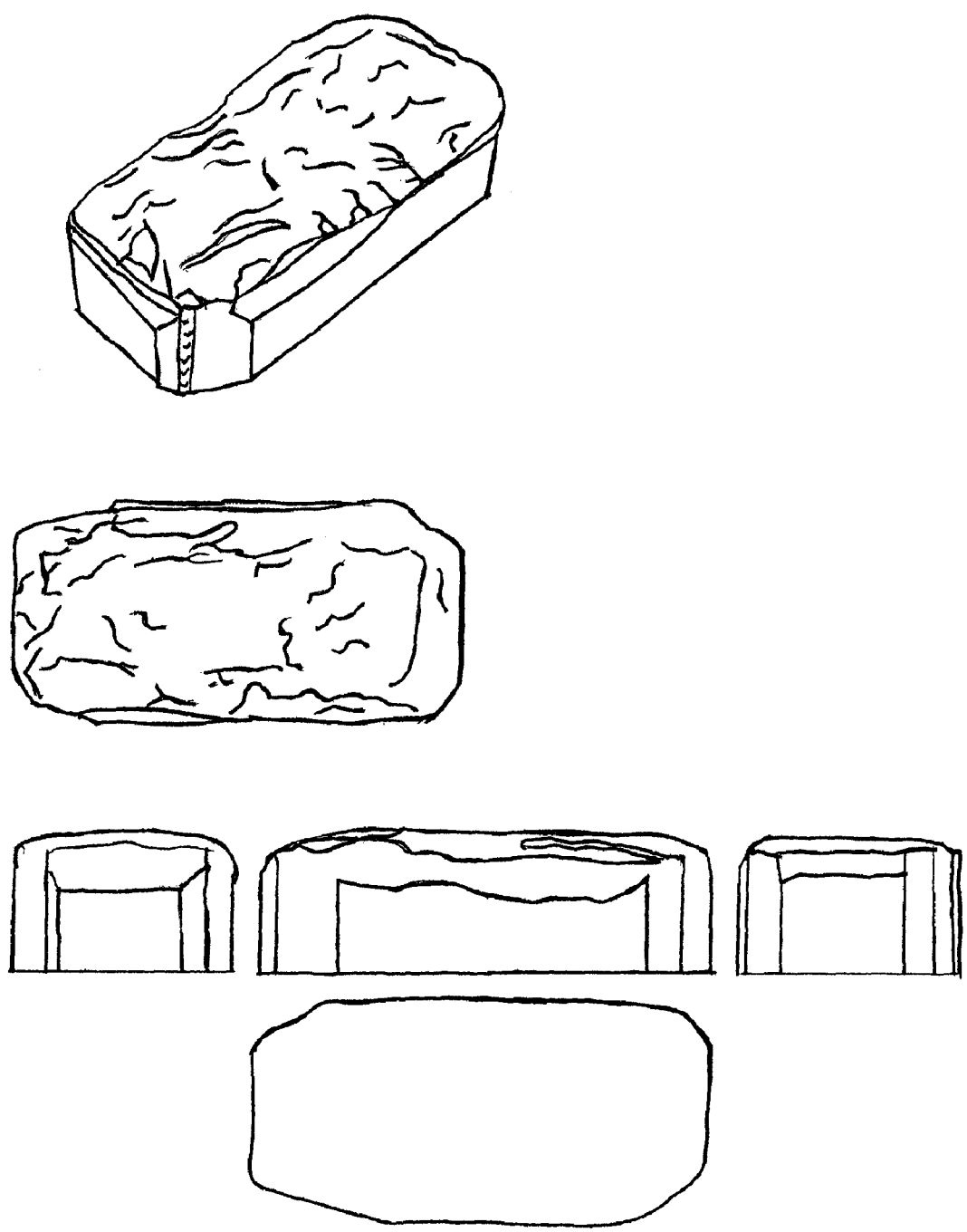
Figure 26:
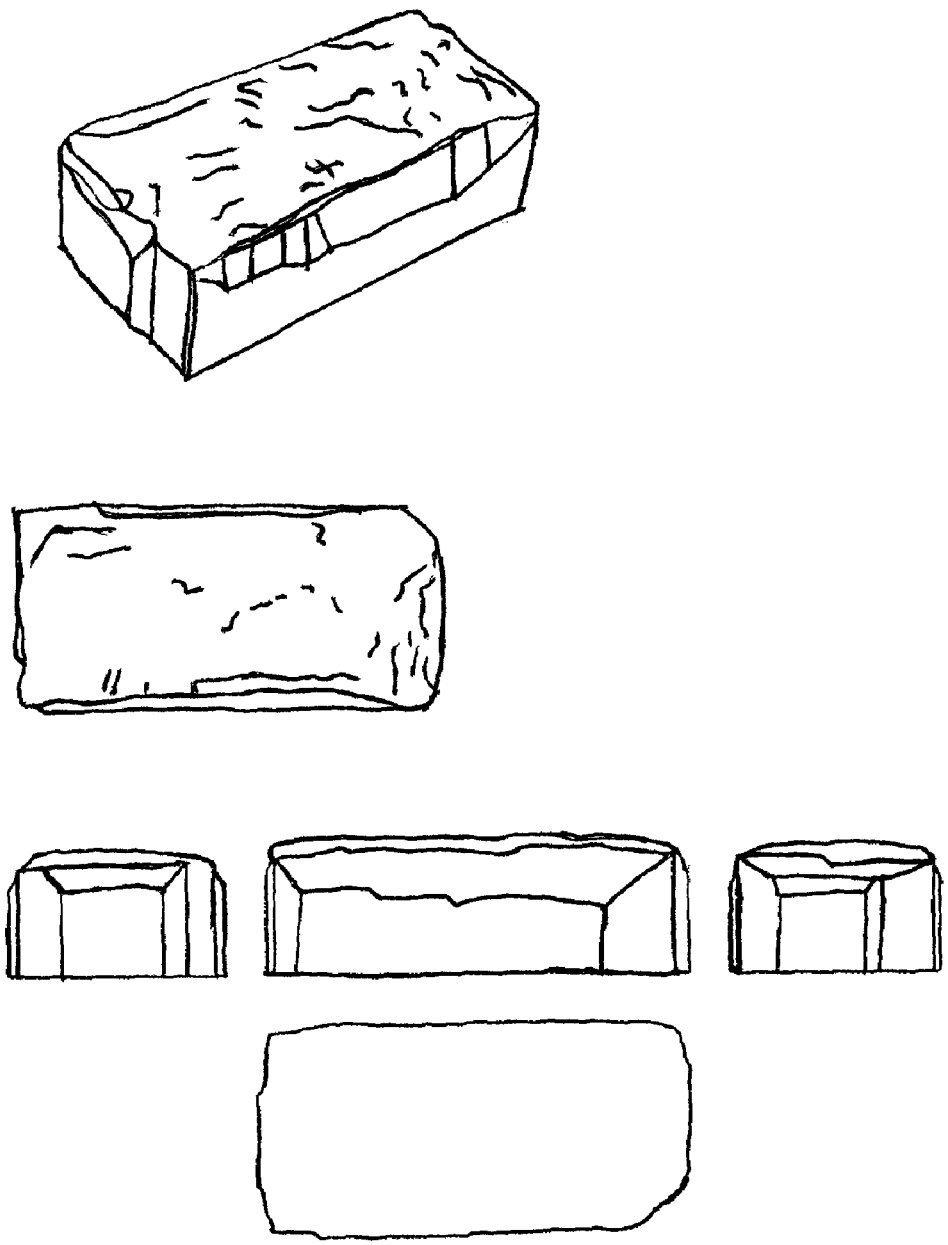
Figure 27:
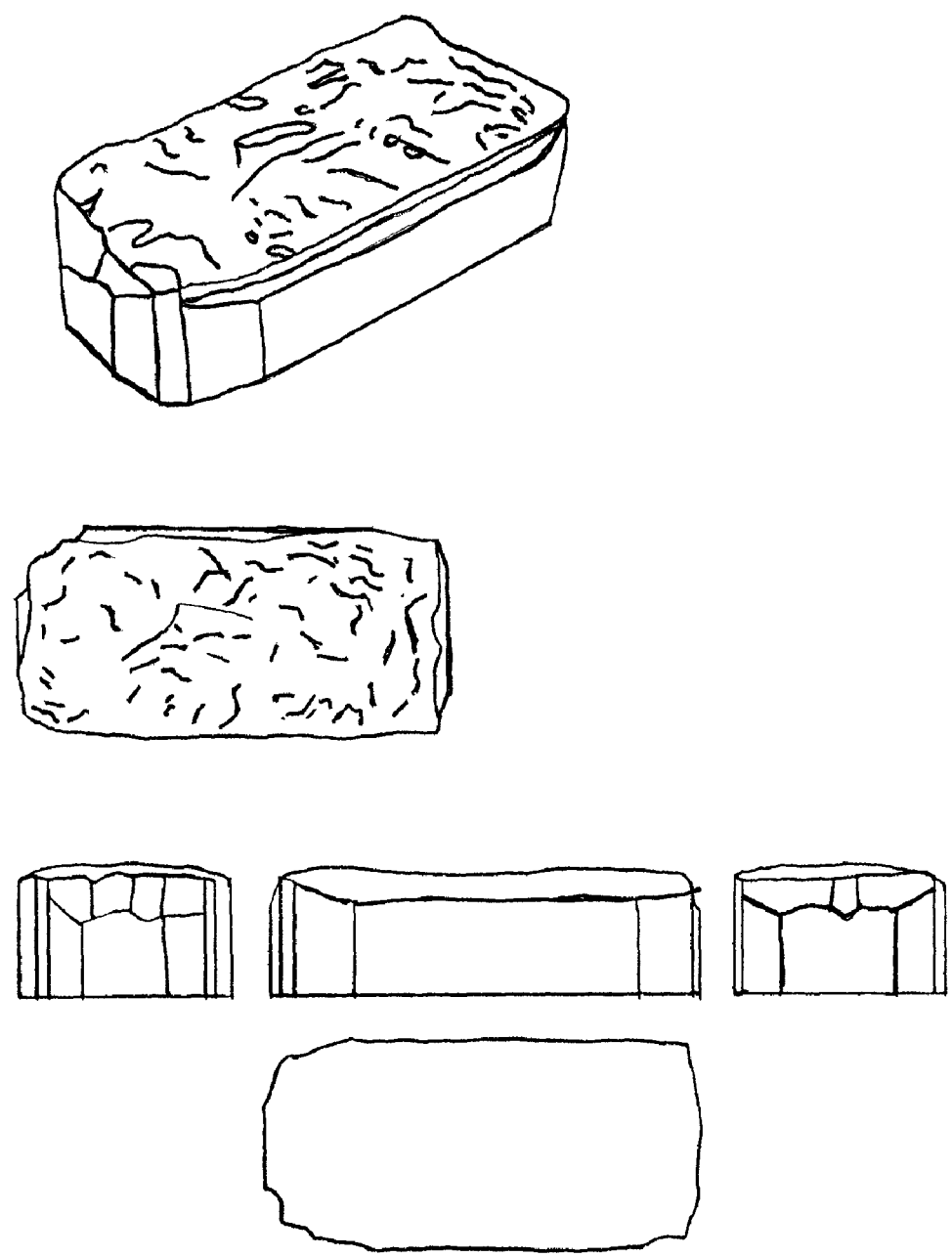
Figure 28:
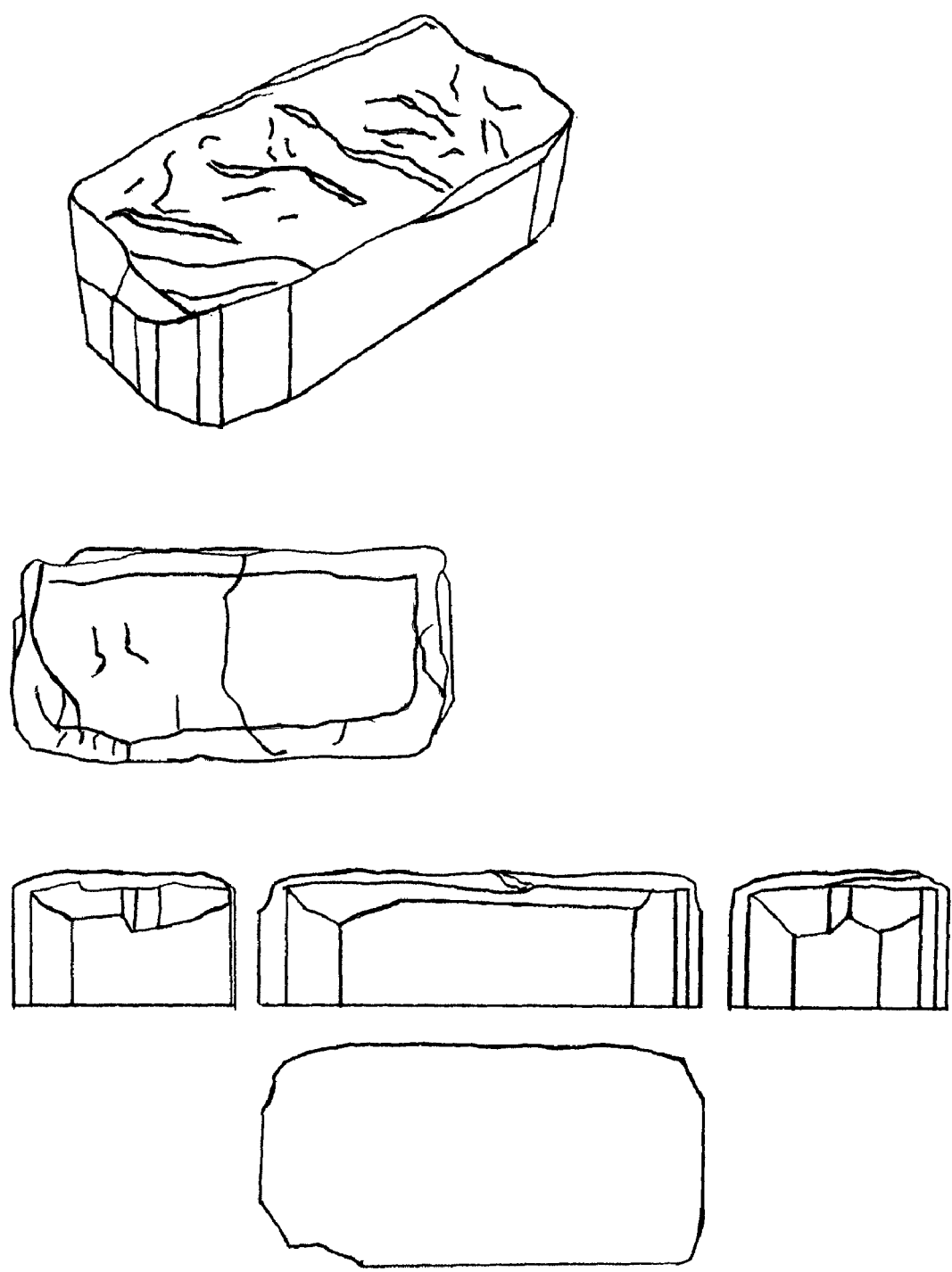
Figure 29:
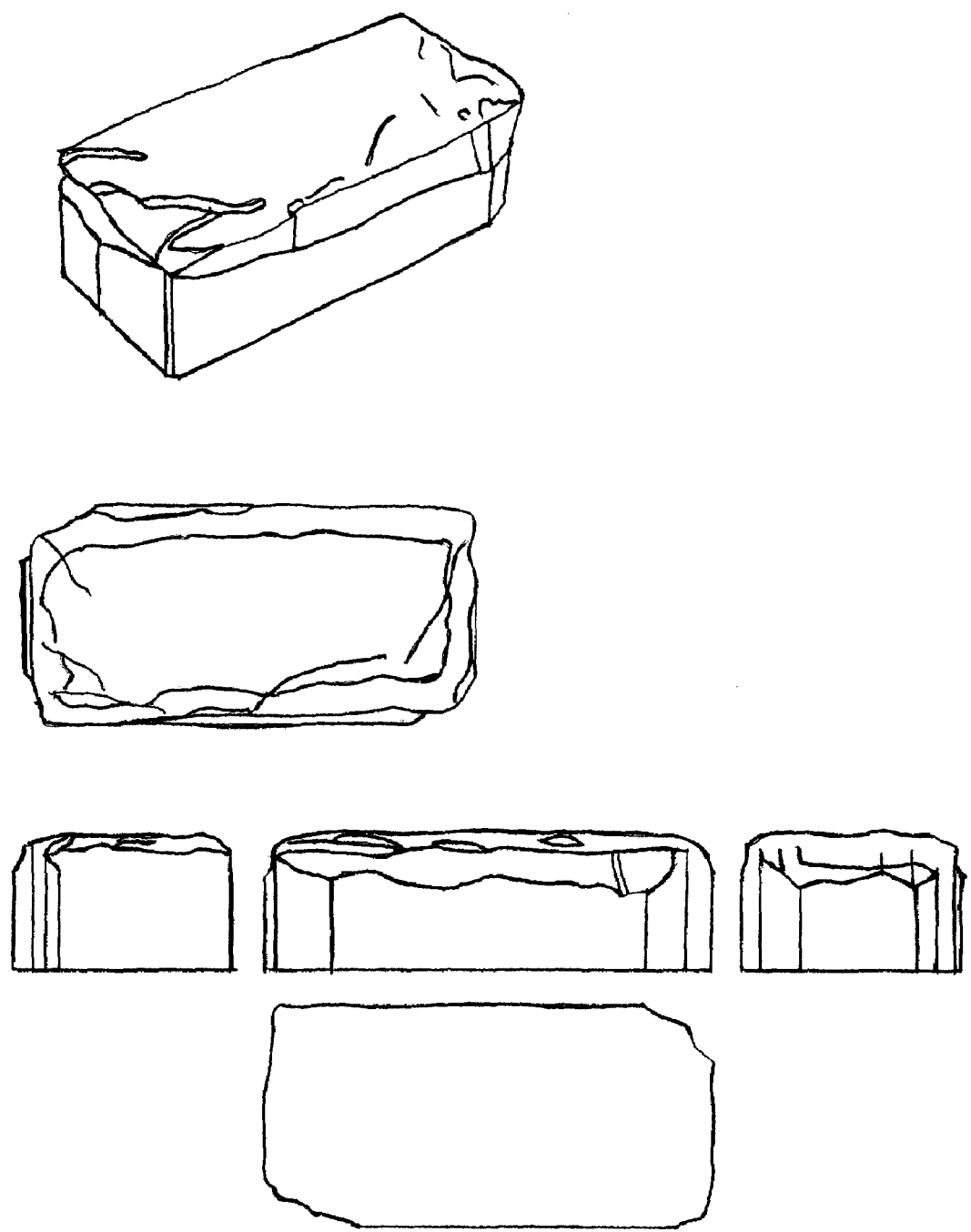
Figure 30:
Figure 31:
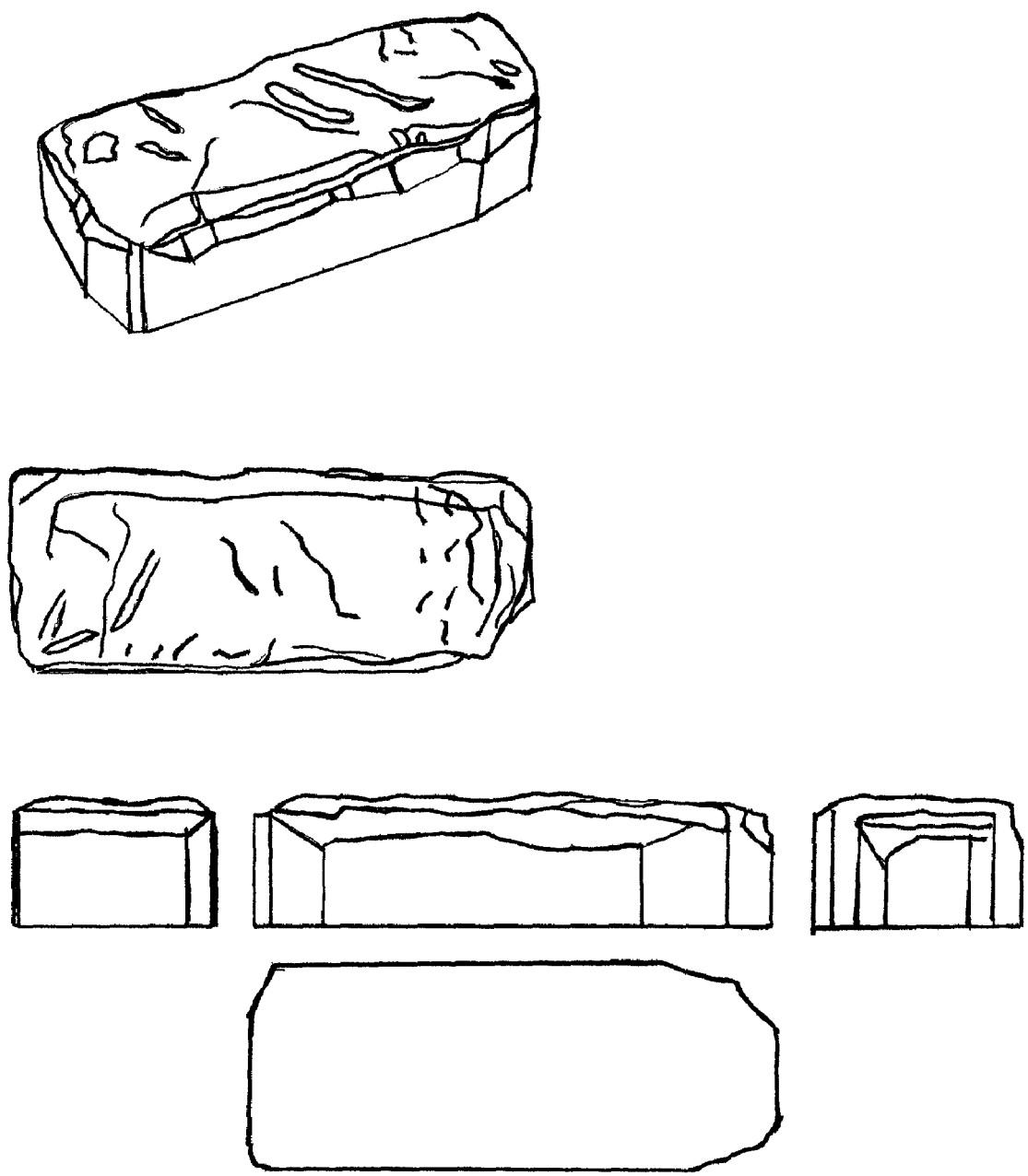
Figure 32:
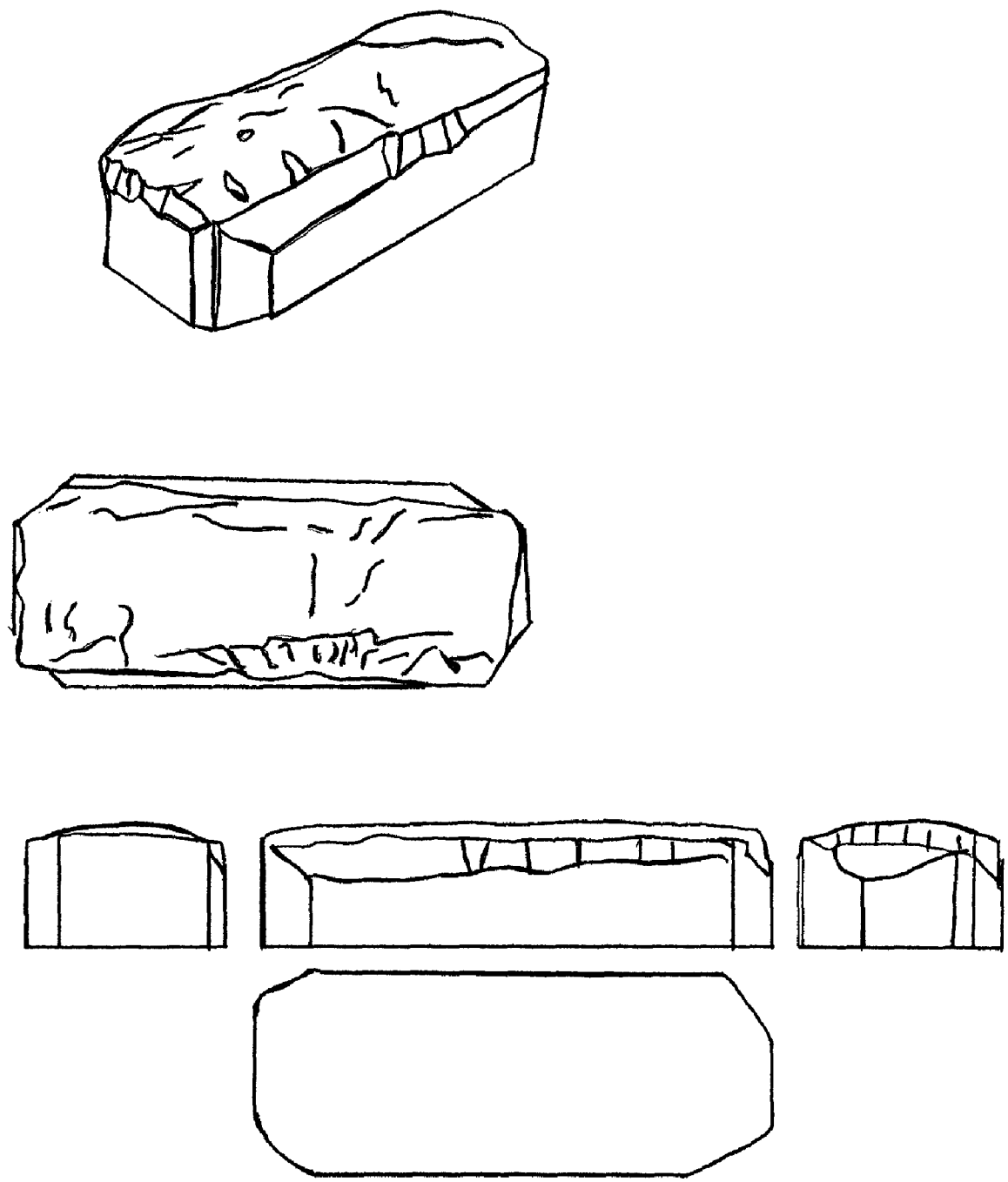
Figure 33:
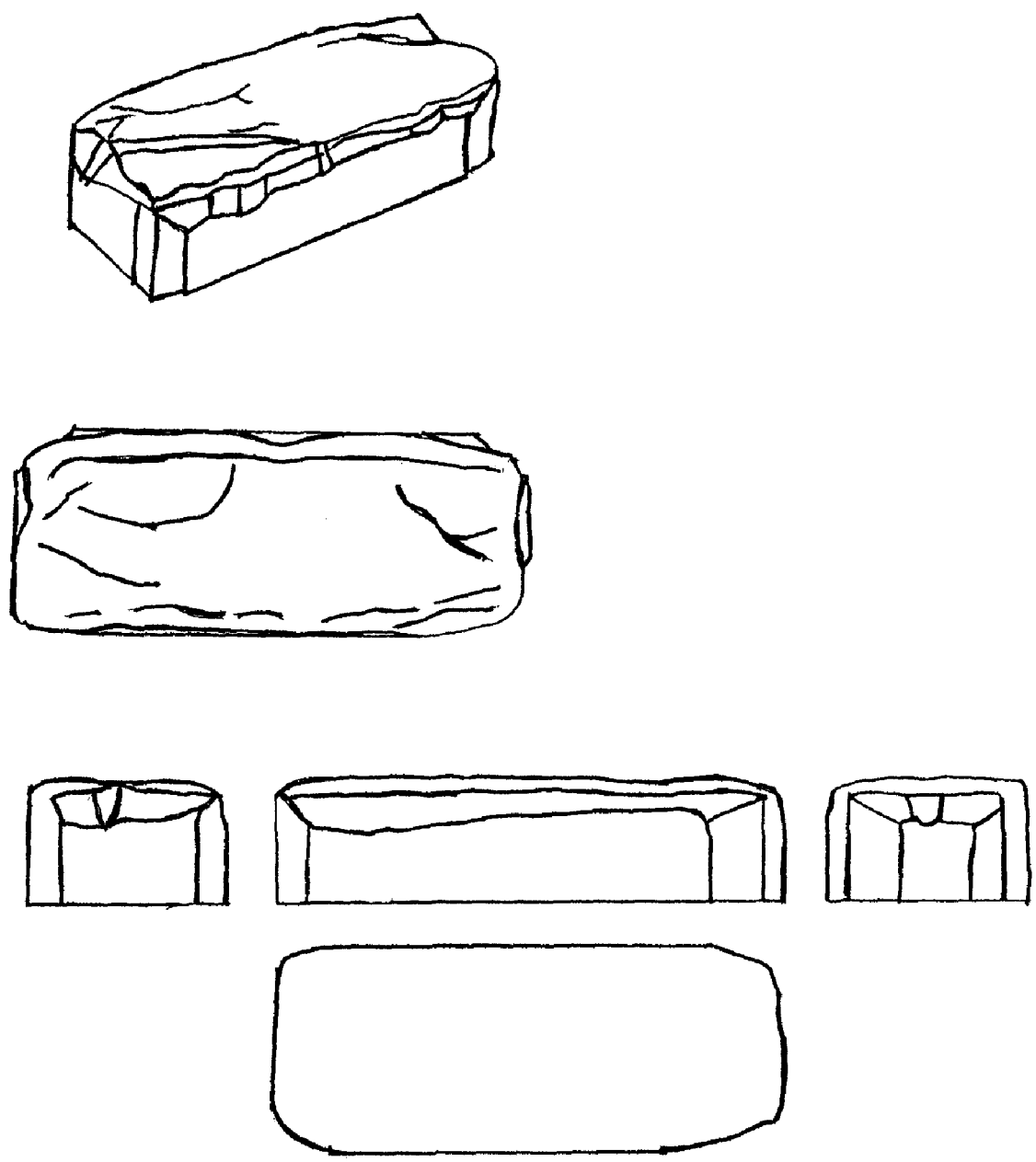
Figure 34:
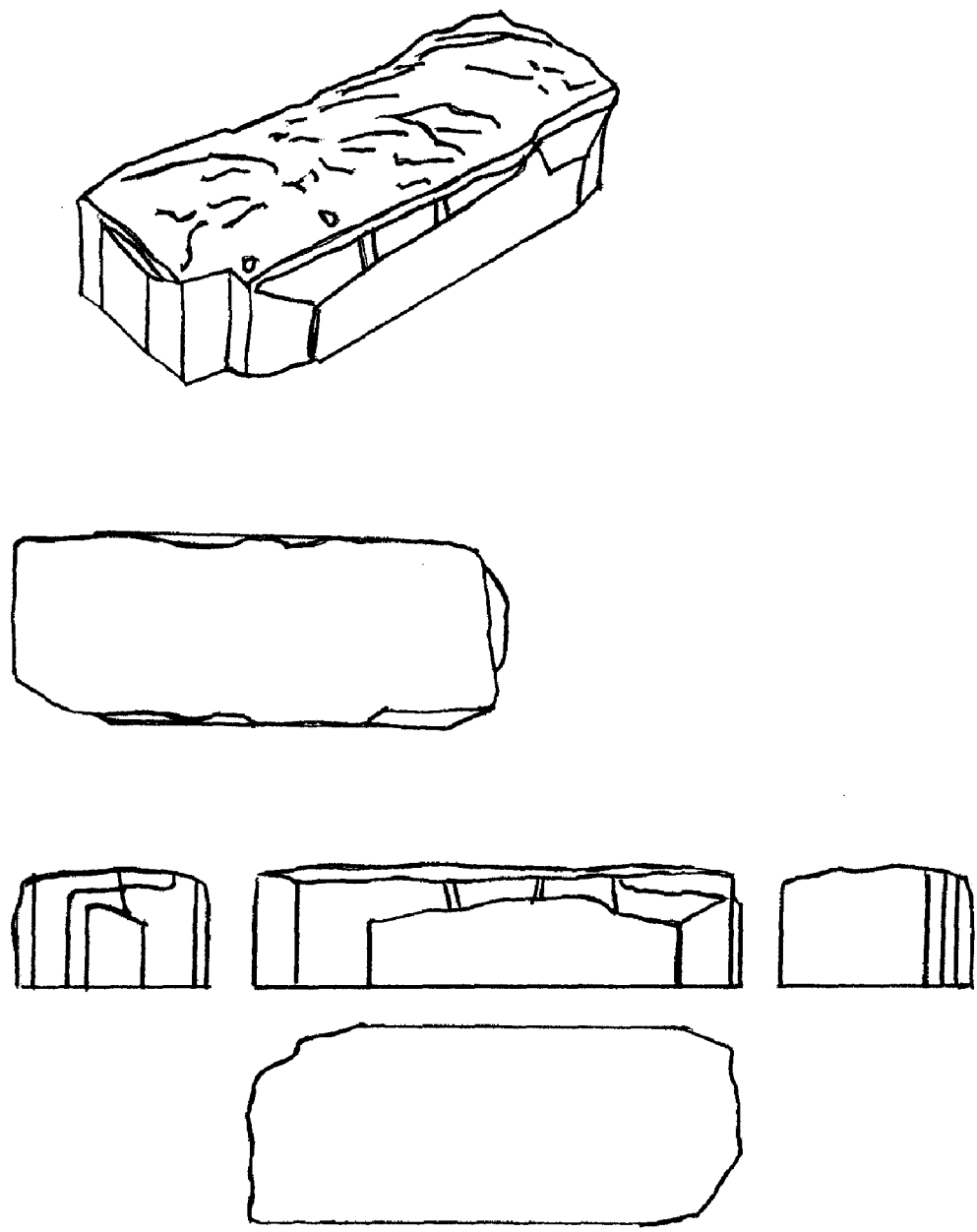
Figure 35:
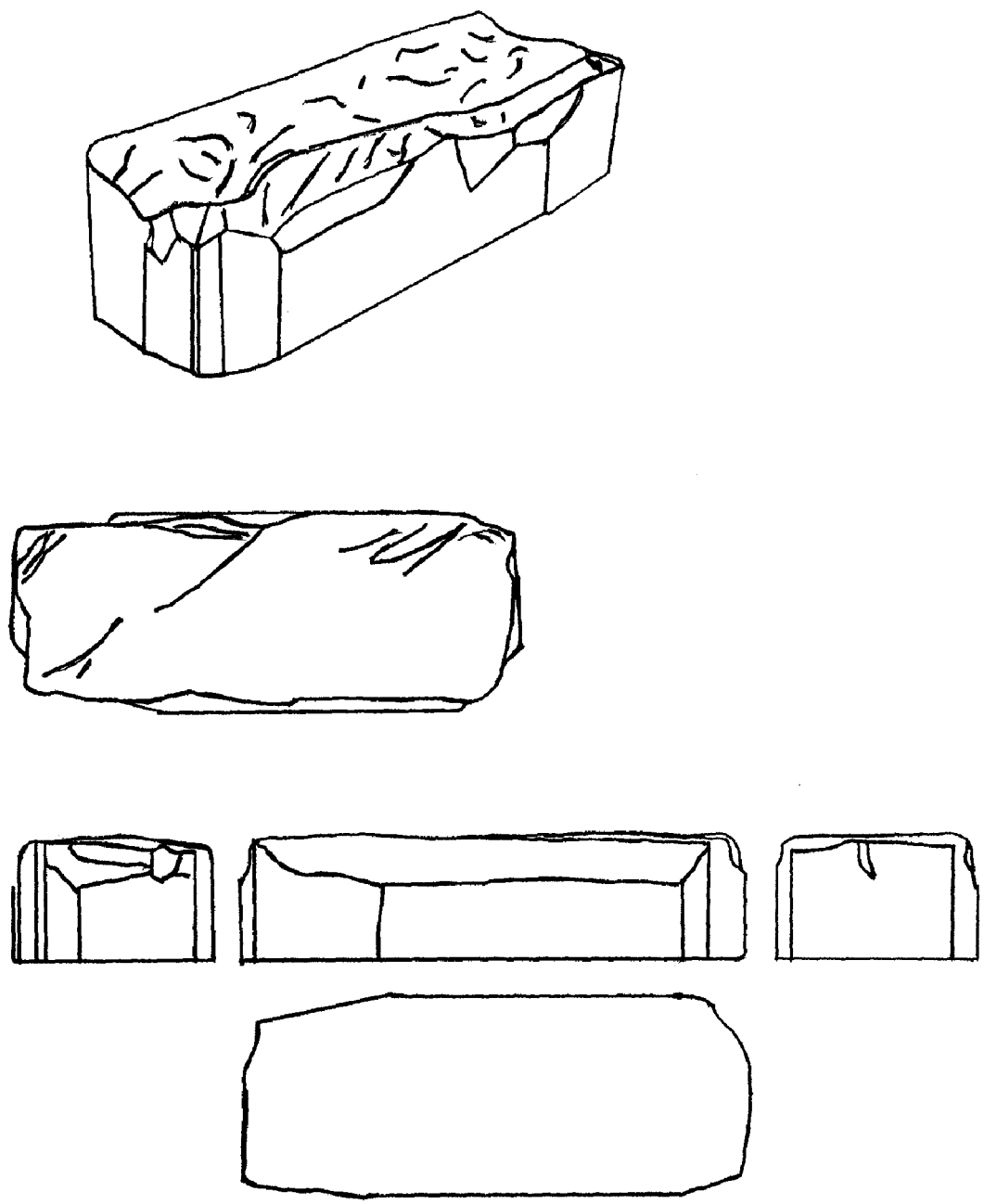
Figure 36:
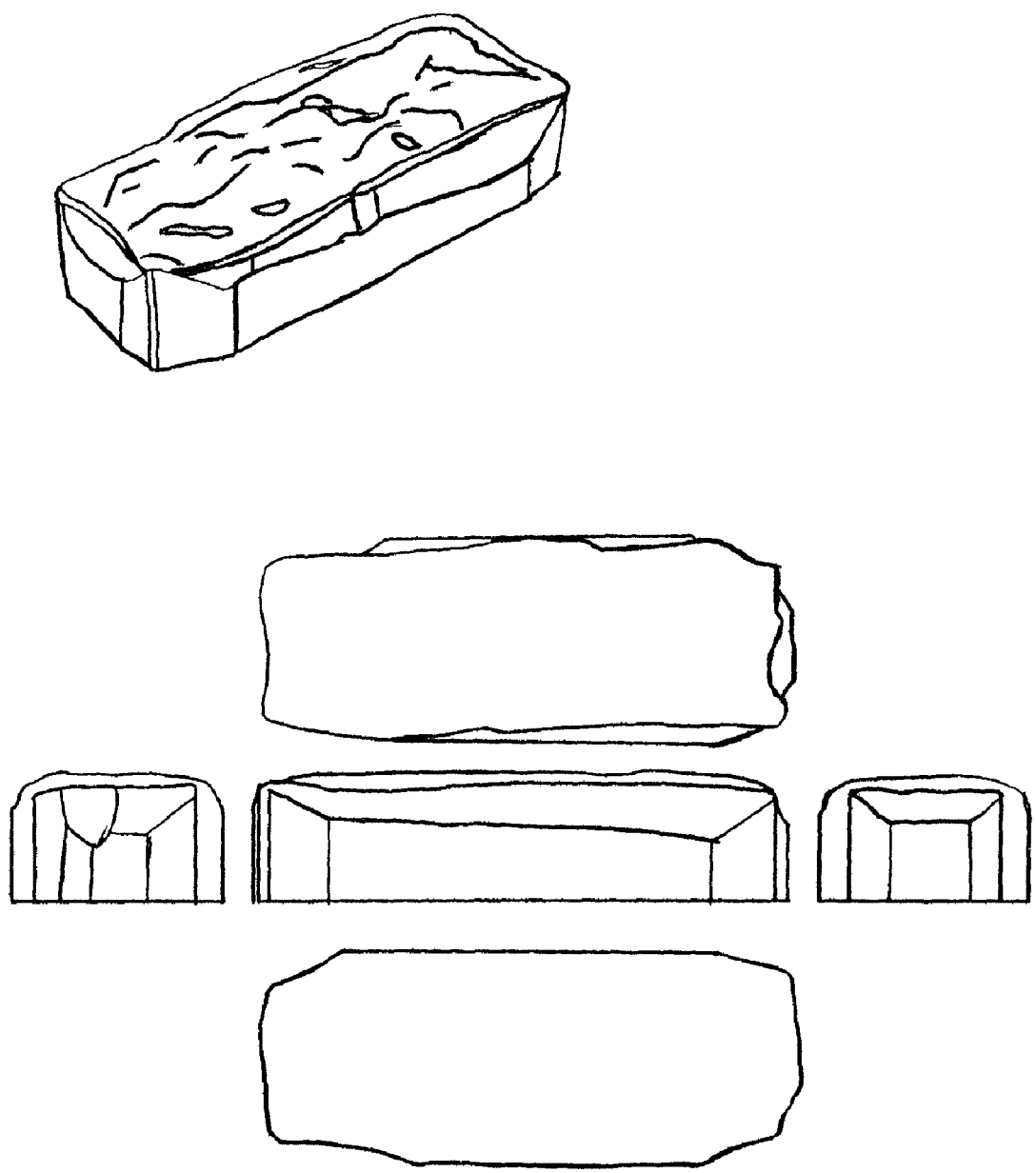
Figure 37:
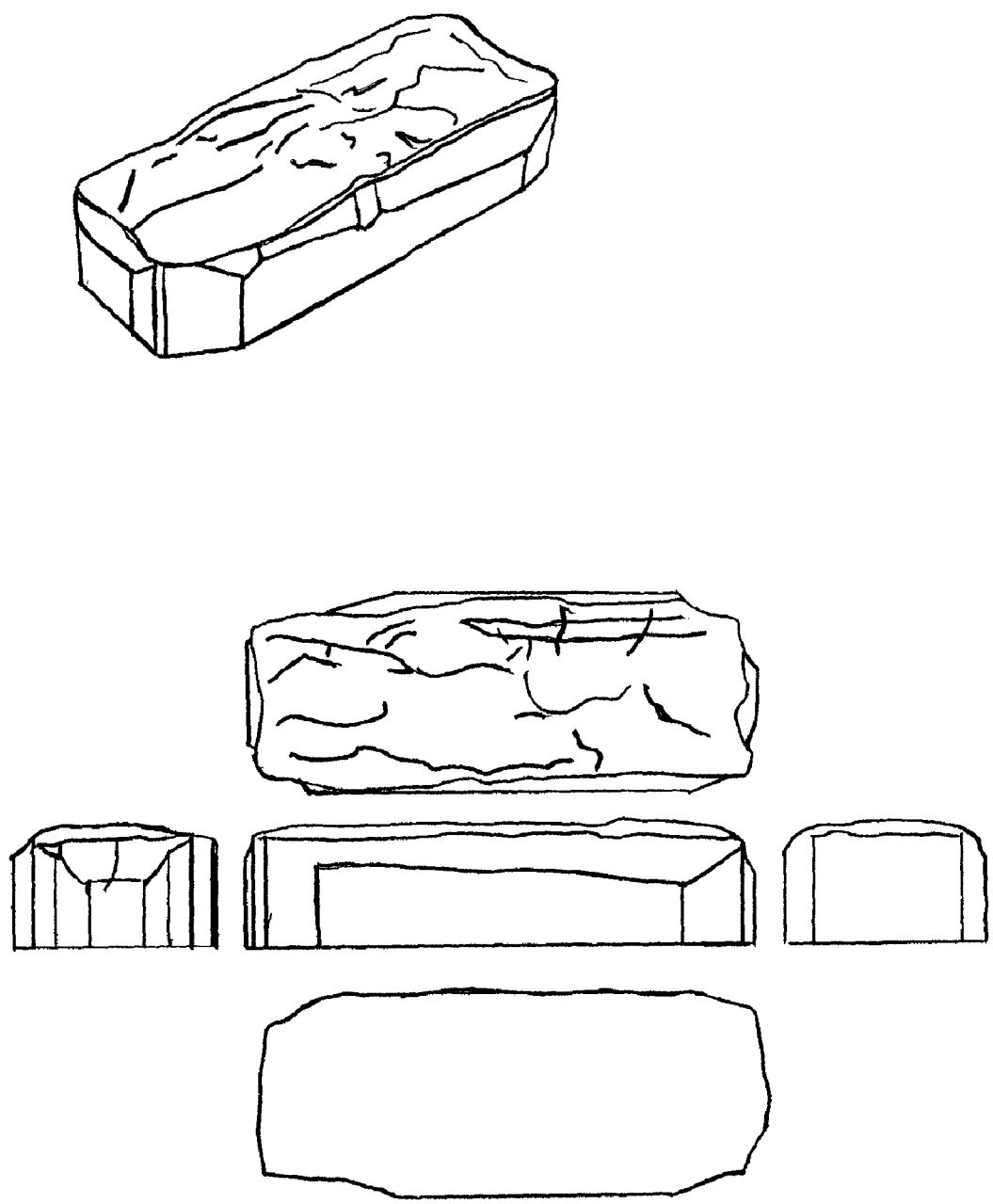
Figure 38:
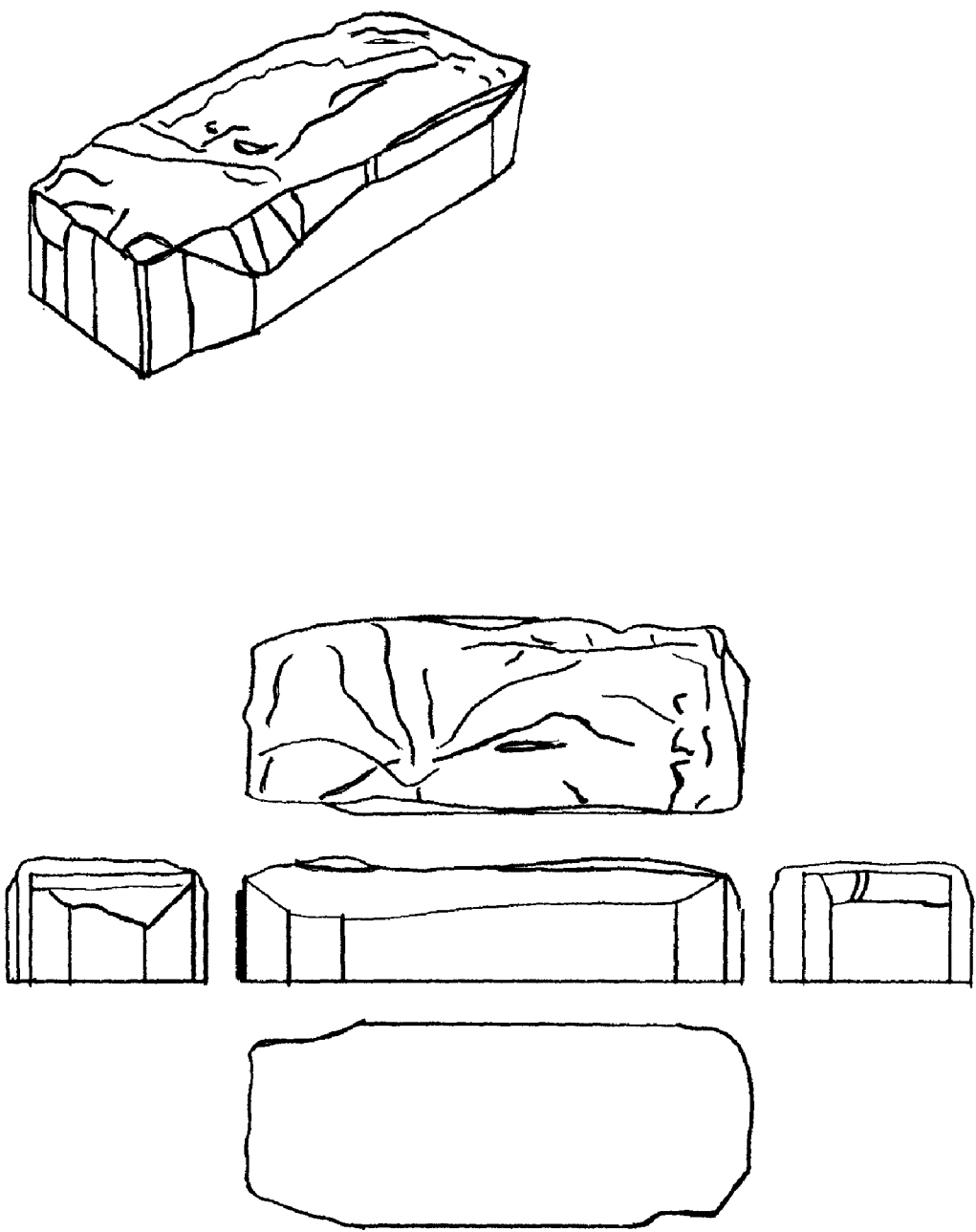

The artificial flagstone 1 is preferably manufactured by dry casting. In order to facilitate filling of the dry casting mold and stripping of the freshly molded stone, the base portion 10, which has multiple corners, preferably has at least one corner 12, which is partially cut away. The corner 12 may be a chamfered corner 14 as shown in FIG. 1 or may be a beveled corner 15, or a rounded corner 16 as shown in FIG. 8. As is apparent from the exemplary embodiments shown in FIGS. 8-38, more than one corner can be chamfered, beveled or rounded.

The contour 33 of the facing surface 32 preferably fits into and is located above the footprint 18 of the base portion 10 (see FIG. 1) to enable stripping of the flagstone 1 from the mold in a dry casting operation. Furthermore, the depending rim 34 is preferably oriented perpendicular to a bottom surface 19 of the base portion 10. This facilitates dry casting of differing artificial flagstones, since facing surfaces 32 of different appearance and contour 33 can be produced with the same mold frame by simply changing the compression shoe of the dry casting mold. The depending rim 32 ensures proper alignment and fit of the shoe and avoids damage to the molded stone during stripping from the mold.

The intermediate portion 50 preferably has at least one circumferential portion in which it is outwardly tapered. The intermediate portion 50 preferably has at least one sidewall 52 extending between the rim 34 and a sidewall 11 of the base portion 10 and joining the base portion sidewall 11 and the rim 34 at an acute angle of 0 to 25°. The preferred angle is 15°. This construction greatly facilitates the dry casting operation by ensuring even distribution of the concrete mix and, thus, even fill of the mold. Damage to the freshly molded stone during stripping and disengagement from the mold due to sharp corners in the mold and adhesion to mold surfaces is also minimized with this construction.

The outline or contour 33 of the facing surface 32 is preferably irregular for achieving a natural appearance. To further enhance the natural appearance of the top portion 30, the facing surface 32 preferably has at least one irregularly shaped protrusion 35 or depression 36 for giving the top portion 30 the appearance of natural stone. More preferably, the facing surface 32 has at least one irregularly shaped protrusion 35 and at least one irregularly shaped depression 36. In a variant, the facing surface has at least two areas of different elevation 37, 38, which areas are preferably irregularly shaped areas.

To avoid the generation of the 'linear line effect' often observed with regularly shaped artificial stones in the art, especially those with a polygonal facing surface, the flagstone 1 of the present invention is preferably provided with a facing surface 32 which is rotated or shifted relative to the polygonal cross-section or footprint of the base portion 10. This is particularly advantageous when the base portion 10 is in the shape of a right regular prism and the facing surface 32 has a polygonal contour including the same number of sides as the base portion 10. 'Rotated' in this context means a placement of the facing surface 32 in an orientation in which an axis of symmetry of the facing surface is oriented in a different direction than a corresponding axis of symmetry of the base portion 10. As a result, the edges of the top surface 32 are not parallel to sides 11 of the base portion 10 (see FIGS. 8-38).

The exemplary artificial flagstones shown in FIGS. 2-38 are shaped and constructed as paving stones, preferably produced in a dry casting mold.

Figure 39:
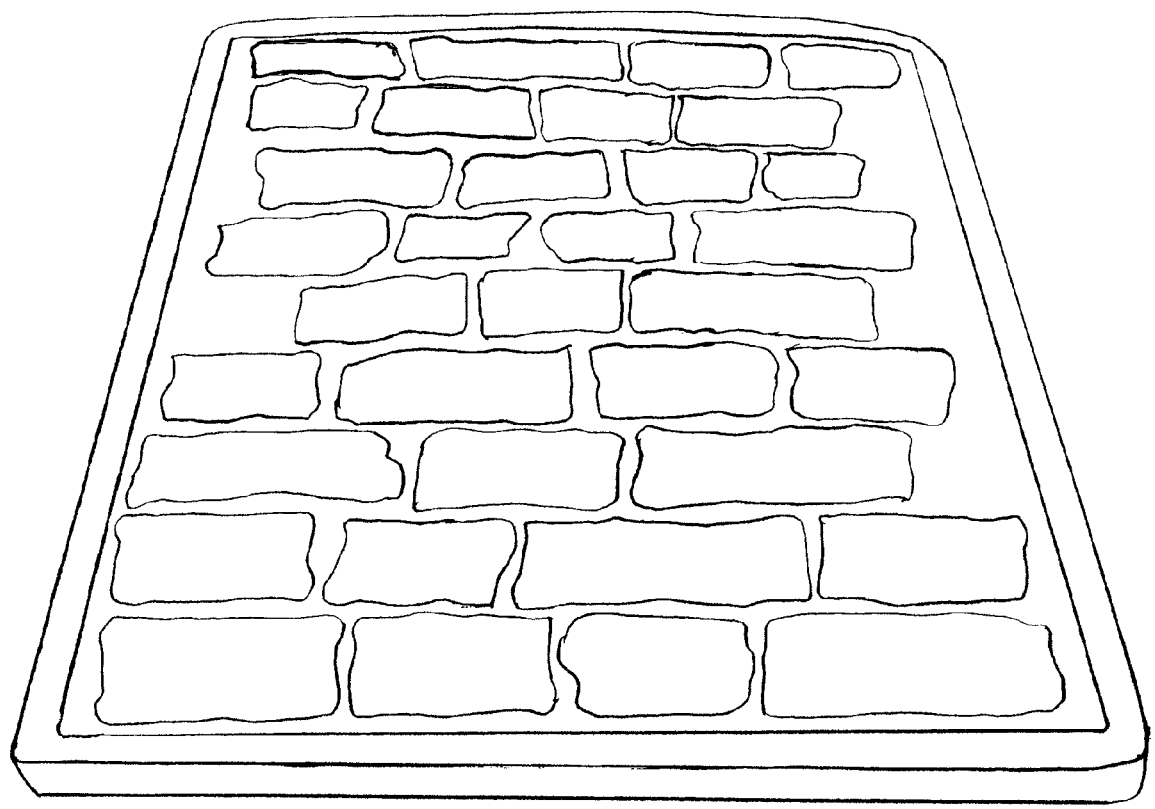
FIG. 39 shows several different flagstones in accordance with the invention placed in a regular, fitted pattern producing a surface covering with an irregular surface appearance.

FIG. 39 shows a set of artificial flagstones 1 in accordance with the invention producing a regular surface covering with an irregular surface, simulating the appearance of natural stone. The set includes multiple flagstones 1 with base portions shaped to fit together in a regular arrangement producing a surface covering and top portions with an irregularly shaped facing surface. As is apparent, the top surface contour of each stone in the set is different. In other words, the top surface contour of each stone in the set is different from the top surface contour of every other flagstone in the set.

In a preferred embodiment of the set aspect of the invention, a set of flagstones includes all the stones made within a multi-cavity dry casting frame, whereby each cavity produces one stone with a facing surface that is unique within the set. The base portions of the flagstones in the set preferably have a similar polygonal cross-section and are shaped as a right prism so that the base portions fit together in a regular arrangement of the flagstones in the set and flagstones of other like sets.

In a preferred set in accordance with the invention, the facing surfaces preferably have an irregular contour which fits within and is positioned within the footprint of the base portion, to facilitate dry casting.

While the invention has been described with a certain degree of particularity, it is understood that the invention is not limited to the embodiments set forth herein for purposes of exemplification, but is to be limited only by the scope of the attached claims, including the full range of equivalency to which each element thereof is entitled.

Although the present invention has been explained hereinabove by way of preferred embodiments thereof, it should be pointed out that any modifications to these preferred embodiments within the scope of the appended claims are not deemed to alter or change the nature and scope of the present invention.

The invention claimed is:

1. An artificial stone for covering a supporting surface, comprising
   a base portion for placement on the supporting surface, a top portion and an intermediate portion connecting the top and base portions,
   the base portion being shaped for patterned, fitting arrangement of the stone with like stones to produce a covering of stones on the supporting surface in a regular pattern, the base portion having a flat polygonal base with a regular base contour and upstanding right angle base walls, each with parallel side edges, a straight bottom edge at the base contour and an irregular top edge adjacent the intermediate portion;
   the top portion having a facing surface and depending top walls, the facing surface having an irregularly shaped top contour, and the depending top walls having irregularly shaped top and bottom edges of differing shape; and
   the intermediate portion having an inclined wall extending between the top portion and the base portion and the inclined wall including multiple planar wall sections having straight side edges, each planar wall section connected to the bottom edge of at least one of the top walls and the top edge of at least one of the base walls, for generating visible joints of irregular width and outline between adjacent like stones in an installed condition.

2. The artificial stone of claim 1, wherein each wall section is inclined at an acute angle of at most 25° relative to the connected base wall.

3. The artificial stone of claim 2, wherein the angle is about 15°.

4. The artificial stone of claim 1, wherein the base portion has a flat bottom for placement on the supporting surface and the depending top walls being oriented perpendicular to the flat bottom.

5. The artificial stone of claim 1, wherein the artificial stone is a dry molded flagstone and the base portion has multiple corners, at least one of the corners being chamfered, beveled or rounded.

6. The artificial stone of claim 5, wherein at least one pair of opposing corners is chamfered, beveled, or rounded.

7. The artificial stone of claim 1, wherein the top contour fits within the base contour.

8. The artificial stone of claim 1, wherein the facing surface has at least two areas of different elevation.

9. The artificial stone of claim 1, wherein the facing surface has at least two irregularly shaped areas of respectively different elevation.

10. The artificial stone of claim 8, wherein the facing surface of the top portion has at least one irregularly shaped protrusion or depression for giving the top portion the appearance of natural stone.

11. The artificial stone of claim 9, wherein the facing surface has at least one irregularly shaped protrusion and at least one irregularly shaped depression.

12. The artificial stone of claim 1, wherein the artificial stone is shaped and constructed as a paving stone.

13. The artificial stone of claim 12, wherein the paving stone is a dry cast paver.

14. The artificial stone of claim 1, wherein the base contour is polygonal and the top contour is polygonal and has the same number of sides as the base contour, the base portion has a side wall for each side of the polygonal base contour and the top contour is rotated or shifted relative to the base contour so that a plane of at least one depending side wall of the top portion intersects with a plane of one base wall of the base portion.

* * * * *